INVENTOR
D. MUIR, III
BY [signature]
ATTORNEY

March 19, 1968 D. MUIR III 3,374,463

SHIFT AND ROTATE CIRCUIT FOR A DATA PROCESSOR

Filed Dec. 23, 1964 18 Sheets-Sheet [illegible]

March 19, 1968 D. MUIR III 3,374,463

SHIFT AND ROTATE CIRCUIT FOR A DATA PROCESSOR

Filed Dec. 23, 1964 18 Sheets-Sheet 3

March 19, 1968 D. MUIR III 3,374,463

SHIFT AND ROTATE CIRCUIT FOR A DATA PROCESSOR

Filed Dec. 23, 1964 18 Sheets-Sheet

FIG. 8A
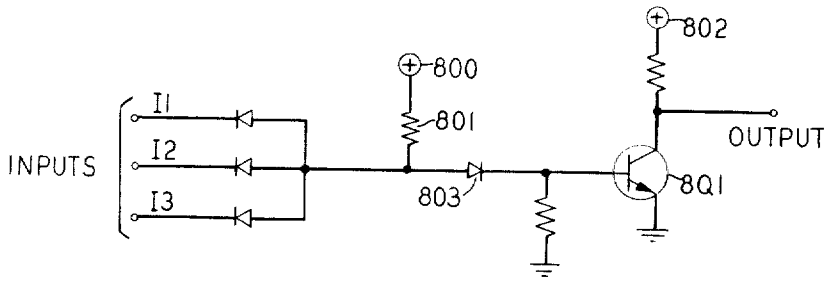
FIG. 8B
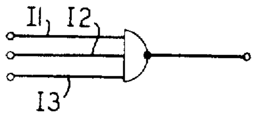
FIG. 8C
| I1 | I2 | I3 | OUTPUT |
|---|---|---|---|
| 0 | 0 | 0 | 1 |
| 0 | 0 | 1 | 1 |
| 0 | 1 | 0 | 1 |
| 0 | 1 | 1 | 1 |
| 1 | 0 | 0 | 1 |
| 1 | 0 | 1 | 1 |
| 1 | 1 | 0 | 1 |
| 1 | 1 | 1 | 0 |
FIG. 19
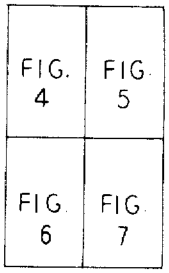
FIG. 20
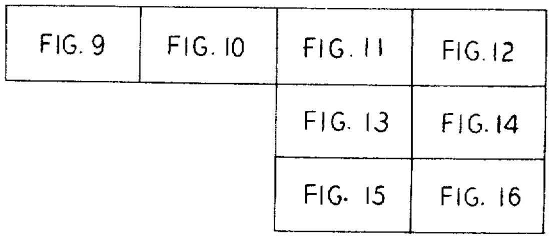

SHIFT AND ROTATE CIRCUIT FOR A DATA PROCESSOR

Filed Dec. 23, 1964

March 19, 1968 D. MUIR III 3,374,463

SHIFT AND ROTATE CIRCUIT FOR A DATA PROCESSOR

Filed Dec. 23, 1964 18 Sheets-Sheet 12

FIG. 17

TRANSMISSION FUNCTIONS OF PATHS WHICH ARE BLOCKED TO ACCOMPLISH RIGHT SHIFTS

| BLOCKING DESIRED ON PATH | BLOCKING APPLIED TO PATHS | TRANSMISSION FUNCTION FOR BLOCKED PATHS: STEERING TERM | TERM TO ACCOMPLISH BLOCKING | TERM TO COMPENSATE FOR BLOCKING AT OTHER THAN DESIRED PATHS | ALTERNATE EXPRESSION |
|---|---|---|---|---|---|
| 0A-19B | SAME | X1 | $\overline{HR}$ | | |
| 0B-18C | 1A-0B<br>0A-0B | X1<br>$\overline{X1}$ | [ $\overline{HR}$<br>[ $\overline{HR}$ | + $\overline{X2}$ ]<br>+ $\overline{X2}$ ] | X1 (Z18)<br>$\overline{X1}$ (Z18) |
| 1B-19C | 2A-1B<br>1A-1B | X1<br>$\overline{X1}$ | [ $\overline{HR}$<br>[ $\overline{HR}$ | + $\overline{X2}$ ]<br>+ $\overline{X2}$ ] | X1 (Z18)<br>$\overline{X1}$ (Z18) |
| 0C-16D | SAME | X4 | $\overline{HR}$ | | |
| 1C-17D | SAME | X4 | $\overline{HR}$ | | |
| 2C-18D | SAME | X4 | $\overline{HR}$ | | |
| 3C-19D | SAME | X4 | $\overline{HR}$ | | |
| 0D-12E | 4C-0D<br>0C-0D | X4<br>$\overline{X4}$ | [ $\overline{HR}$<br>[ $\overline{HR}$ | + $\overline{X8}$ ]<br>+ $\overline{X8}$ ] | X4 (Z20)<br>$\overline{X4}$ (Z20) |
| 1D-13E | 5C-1D<br>1C-1D | X4<br>$\overline{X4}$ | [ $\overline{HR}$<br>[ $\overline{HR}$ | + $\overline{X8}$ ]<br>+ $\overline{X8}$ ] | X4 (Z20)<br>$\overline{X4}$ (Z20) |
| 2D-14E | 6C-2D<br>2C-2D | X4<br>$\overline{X4}$ | [ $\overline{HR}$<br>[ $\overline{HR}$ | + $\overline{X8}$ ]<br>+ $\overline{X8}$ ] | X4 (Z20)<br>$\overline{X4}$ (Z20) |
| 3D-15E | 7C-3D<br>3C-3D | X4<br>$\overline{X4}$ | [ $\overline{HR}$<br>[ $\overline{HR}$ | + $\overline{X8}$ ]<br>+ $\overline{X8}$ ] | X4 (Z20)<br>$\overline{X4}$ (Z20) |
| 4D-16E | 8C-4D<br>4C-4D | X4<br>$\overline{X4}$ | [ $\overline{HR}$<br>[ $\overline{HR}$ | + $\overline{X8}$ ]<br>+ $\overline{X8}$ ] | X4 (Z20)<br>$\overline{X4}$ (Z20) |
| 5D-17E | 9C-5D<br>5C-5D | X4<br>$\overline{X4}$ | [ $\overline{HR}$<br>[ $\overline{HR}$ | + $\overline{X8}$ ]<br>+ $\overline{X8}$ ] | X4 (Z20)<br>$\overline{X4}$ (Z20) |
| 6D-18E | 10C-6D<br>6C-6D | X4<br>$\overline{X4}$ | [ $\overline{HR}$<br>[ $\overline{HR}$ | + $\overline{X8}$ ]<br>+ $\overline{X8}$ ] | X4 (Z20)<br>$\overline{X4}$ (Z20) |
| 7D-19E | 11C-7D<br>7C-7D | X4<br>$\overline{X4}$ | [ $\overline{HR}$<br>[ $\overline{HR}$ | + $\overline{X8}$ ]<br>+ $\overline{X8}$ ] | X4 (Z20)<br>$\overline{X4}$ (Z20) |
| 0E-4F | SAME | X16 | $\overline{HR}$ | | |
| 1E-5F | SAME | X16 | $\overline{HR}$ | | |
| 2E-6F | SAME | X16 | $\overline{HR}$ | | |
| 3E-7F | SAME | X16 | $\overline{HR}$ | | |
| 4E-8F | SAME | X16 | $\overline{HR}$ | | |
| 5E-9F | SAME | X16 | $\overline{HR}$ | | |
| 6E-10F | SAME | X16 | $\overline{HR}$ | | |
| 7E-11F | SAME | X16 | $\overline{HR}$ | | |
| 8E-12F | SAME | X16 | $\overline{HR}$ | | |
| 9E-13F | SAME | X16 | $\overline{HR}$ | | |
| 10E-14F | SAME | X16 | $\overline{HR}$ | | |
| 11E-15F | SAME | X16 | $\overline{HR}$ | | |
| 12E-16F | SAME | X16 | $\overline{HR}$ | | |
| 13E-17F | SAME | X16 | $\overline{HR}$ | | |
| 14E-18F | SAME | X16 | $\overline{HR}$ | | |
| 15E-19F | SAME | X16 | $\overline{HR}$ | | |

FIG. 18

TRANSMISSION FUNCTIONS OF PATHS WHICH ARE BLOCKED TO ACCOMPLISH LEFT SHIFTS

| BLOCKING DESIRED ON PATH | BLOCKING APPLIED TO PATHS | TRANSMISSION FUNCTION FOR BLOCKED PATHS: STEERING TERM | TERM TO ACCOMPLISH BLOCKING | TERM TO COMPENSATE FOR BLOCKING AT OTHER THAN DESIRED PATHS | ALTERNATE EXPRESSION |
|---|---|---|---|---|---|
| 19A-19B | SAME | $\overline{X1}$ | [$\overline{HL}$+X16(X4)] | | $\overline{X1}$(Z14) |
| 18B-18C | 19A-18B<br>18A-18B | X1<br>$\overline{X1}$ | [$\overline{HL}$+X16(X4)<br>[$\overline{HL}$+X16(X4) | +X2]<br>+X2] | X1(Z17)<br>$\overline{X1}$(Z17) |
| 17B-17C | 18A-17B<br>17A-17B | X1<br>$\overline{X1}$ | [$\overline{HL}$+X16(X4)<br>[$\overline{HL}$+X16(X4) | +X2]<br>+X2] | X1(Z17)<br>$\overline{X1}$(Z17) |
| 16C-16D | SAME | $\overline{X4}$ | $\overline{HL}$ | | |
| 15C-15D | SAME | $\overline{X4}$ | [$\overline{HL}$+X16] | | $\overline{X4}$(Z15) |
| 14C-14D | SAME | $\overline{X4}$ | [$\overline{HL}$+X16] | | $\overline{X4}$(Z15) |
| 13C-13D | SAME | $\overline{X4}$ | [$\overline{HL}$+X16] | | $\overline{X4}$(Z15) |
| 12D-12E | 16C-12D<br>12C-12D | X4<br>$\overline{X4}$ | [$\overline{HL}$+X16<br>[$\overline{HL}$+X16 | +X8]<br>+X8] | X4(Z19)<br>$\overline{X4}$(Z19) |
| 11D-11E | 15C-11D<br>11C-11D | X4<br>$\overline{X4}$ | [$\overline{HL}$+X16<br>[$\overline{HL}$+X16 | +X8]<br>+X8] | X4(Z19)<br>$\overline{X4}$(Z19) |
| 10D-10E | 14C-10D<br>10C-10D | X4<br>$\overline{X4}$ | [$\overline{HL}$+X16<br>[$\overline{HL}$+X16 | +X8]<br>+X8] | X4(Z19)<br>$\overline{X4}$(Z19) |
| 9D-9E | 13C-9D<br>9C-9D | X4<br>$\overline{X4}$ | [$\overline{HL}$+X16<br>[$\overline{HL}$+X16 | +X8]<br>+X8] | X4(Z19)<br>$\overline{X4}$(Z19) |
| 8D-8E | 12C-8D<br>8C-8D | X4<br>$\overline{X4}$ | [$\overline{HL}$+X16<br>[$\overline{HL}$+X16 | +X8]<br>+X8] | X4(Z19)<br>$\overline{X4}$(Z19) |
| 7D-7E | 11C-7D<br>7C-7D | X4<br>$\overline{X4}$ | [$\overline{HL}$+X16<br>[$\overline{HL}$+X16 | +X8]<br>+X8] | X4(Z19)<br>$\overline{X4}$(Z19) |
| 6D-6E | 10C-6D<br>6C-6D | X4<br>$\overline{X4}$ | [$\overline{HL}$+X16<br>[$\overline{HL}$+X16 | +X8]<br>+X8] | X4(Z19)<br>$\overline{X4}$(Z19) |
| 5D-5E | 9C-5D<br>5C-5D | X4<br>$\overline{X4}$ | [$\overline{HL}$+X16<br>[$\overline{HL}$+X16 | +X8]<br>+X8] | X4(Z19)<br>$\overline{X4}$(Z19) |
| 4E-4F | SAME | X16 | HL | | |
| 3E-3F | SAME | X16 | HL | | |
| 2E-2F | SAME | $\overline{X16}$ | HL | | |
| 1E-1F | SAME | $\overline{X16}$ | $\overline{HL}$ | | |
| 0E-0F | SAME | $\overline{X16}$ | $\overline{HL}$ | | |

$Z14 = \overline{HL} + (X16)(X4)$
$Z17 = Z14 + X2 = \overline{HL} + (X16)(X4) + X2$
$Z15 = \overline{HL} + X16$
$Z18 = \overline{HR} + \overline{X2}$
$Z19 = \overline{HL} + X16 + X8$
$Z20 = \overline{HR} + X8$ United States Patent Office 3,374,463
Patented Mar. 19, 1968

3,374,463

SHIFT AND ROTATE CIRCUIT FOR A DATA PROCESSOR

David Muir III, Minerva Park, Ohio, assignor to Bell Telephone Laboratories, Incorporated, New York, N.Y., a corporation of New York Filed Dec. 23, 1964, Ser. No. 420,566
23 Claims. (Cl. 340—172.5)

ABSTRACT OF THE DISCLOSURE

A shift and rotate arrangement including a group of serially connected unidirectionally oriented rotate circuits connected between input and output terminals and a control circuit which simultaneously operates all the rotate circuits. Rotate and shift operations of any specified magnitude in either direction are performed by additive rotate operations during a single transmission of a data word from the input terminals through the series of rotate circuits to the output terminals by selective control of individual gating elements within the respective rotate circuits.

This invention relates to data processors and more particularly to shift and rotate circuits for use therein.

In many data processing systems it is necessary to shift and rotate data words. In conventional prior art data processors a word is first placed in one of the system registers. The word is then shifted or rotated, to the left or the right, in the register itself. Although the term "shifting" is used throughout this specification in its generic sense as including the rotate operation, a shift operation is distinct from a rotate operation. When the bits in the data word are shifted out of one of the ends of the register during a rotate operation they are reinserted at the other end of the register. When the word is to be shifted rather than rotated the bits shifted out of the register are not reinserted at the other end and 0's are written in the stages at this other end of the register. Since the data word may be shifted or rotated to the right or the left it is apparent that four distinct operations are possible. The magnitude of the shift in each case must be specified.

In conventional prior art circuits the data word in a register is shifted one position at a time. An improved shift and rotate circuit is disclosed in the copending application of W. B. Cagle et al. Ser. No. 380,274, filed July 6, 1964, now U.S. Patent 3,350,692, issued Oct. 31, 1967. In this circuit the bits in the register may be shifted more than one position at a time and the time required for a shift or rotate operation is materially reduced. However, in this circuit as well as in conventional prior art circuits the data word to be shifted must first be placed in a register before it may be operated upon by the shifting circuitry.

A common sequence of operations in a data processor is the reading of a data word from a memory into one of the system registers, followed by the shifting of the data word in the register. An exceedingly efficient data processor would be one which could shift a data word during its transmission from the memory to the register. In such a system the reading and shifting operations could be performed in the same step and it would not be required to first place the data word in the register before shifting it. Similarly, another sequence of operations which is often required is the transfer of a data word from one register to another followed by the shifting of the data word in the latter register. Again, a machine which could shift the data word while it is being transferred from one register to the other would be highly desirable. In the prior art however, it has not been possible to shift the data word while transferring it within the data processor. It has been necessary to first place the word in a register and then shift it. Prior art shift and rotate circuits are capable of operating only in conjunction with a register; it has priorly been possible to shift a data word only after it first appears in some kind of storage mechanism.

It is a general object of this invention to provide an improved data processor in which logical operations may be performed on data words while they are being transferred from one part of the machine to another.

In prior art shift and rotate circuits in which a data word may be shifted in either direction it is usually necessary to provide circuitry for shifting the bits in the data word to both the left and the right. Typically this circuitry has included gates which are capable of transferring the bits in the stages of a register to other stages to either the left or the right. While my invention contemplates shifting a data word while it is being transferred, rather than shifting it after it is first placed in a register, it would appear that it would be necessary to once again provide two mechanisms for shifting the bits in the data word in the two directions. This is due to the fact that the logical operations performed in my invention are the same as those performed in the prior art circuits.

It is a more specific object of this invention to provide for shift or rotate operations in either direction by the use of unidirectional rotate circuitry.

In accordance with the principles of my invention I incorporate a combinational logic circuit in the path of a data processor over which a data word is transferred from one unit to another. There are two types of inputs to the combinational logic circuit. One set of inputs represents the type of operation to be performed, i.e., shift or rotate, the direction of the shift, i.e., left or right, and the shift magnitude. The other input is supplied by a series of conductors in the transfer path, each of these conductors having an electrical signal therein representative of one of the bits in the data word being transferred in the machine. The output of the combinational logic circuit is provided over another series of conductors each having an electrical signal representative of one of the bits in the shifted data word. The combinational logic circuit is characterized. by gating circuits which allow the flow of bit information between bit position of the data word.

In a typical prior art data processor the transfer path comprises a series of conductors arranged in ascending order of significance, each having one of the bits in the data word being transferred represented therein. In a data processor incorporating the shift and rotate circuit of my invention the signals in the output conductors represent bits in the shifted data word. These signals can control the writing of the shifted data word directly in a register or other memory device. In other words, the two units to which and from which the data word is transmitted may operate as they do in the prior art. But in the course of the transfer of the data word it may be shifted so that a subsequent shift operation is not required.

The combinational logic shift and rotate circuit of my invention is particularly advantageous when incorporated in an electronic data processor. The shift and rotate circuit consists of a series of groups of transmission gates for transferring signals representative of bit values from particular nodes in one group to respective nodes in another. If transistors are used, for example, the delay in transmitting the bits through any stage of the network is a function only of the time required to turn a transistor on or off. If the shift and rotate circuit includes five stages, the total delay introduced by the shift and rotate circuit is merely approximately equal to five times this amount. The total time may thus be only a fraction of a microsecond. Because electronic gates operate so rapidly the data word may be shifted while it is being transferred without introducing any appreciable delay in the transfer time. The use of a combinational logic circuit, in lieu of a shift and rotate circuit which operates in conjunction with a register and which must set and reset the various stages of the register, allows the shift operation to be performed simultaneously with the data transfer operation, and to be performed more rapidly than heretofore possible, thus allowing the data processor to proceed with other useful work.

In the illustrative embodiments of the invention the shift and rotate circuit operates on 20-bit data words. Each of the two embodiments of the invention includes 120 nodes arranged in a matrix array of 20 columns and six rows. The bits in the data word to be operated upon are applied at the nodes in the top row, the most significant bit being applied to the leftmost node in the row and the least significant bit being applied to the rightmost node in the row. The final data word appears at the 20 nodes in the last row. In the course of transmission of the bits through the node network from the first row to the last the bits are operated upon as required.

Twenty transmission paths are provided for connecting the 20 nodes in each row to the 20 respective nodes in the same columns in the next lower row. Twenty transmission paths are also provided to connect the nodes in each row to respective nodes further to the right in the next lower row. The number of columns separating the nodes in different rows which are connected to each other by these paths is the same for each of the groups of 20 "diagonal" paths, but the number of columns is different for the different groups of paths. Suppose the columns from left to right are numbered 19–0 and the rows from top to bottom are designated A–F. Each of the 20 nodes in row A is connected by a respective "vertical" transmission path to the node of row B directly below it. Each of the nodes in row A is also connected by a "diagonal" path to the node one column to its right in row B. The rightmost node in row A is connected to the node in row B in the next "rightmost" column, which, when rotation of the data word is considered, is column 19. The rotation of the data word through the network is accomplished in steps. The first possible step is a shift of 1. If the 20 vertical paths are used the input data word is merely transmitted down to the nodes in row B, but the bit positions are unchanged. If the diagonal paths are used, however, the input data word appears at the nodes in row B after having been rotated one position to the right.

Similarly, 20 vertical paths connect the nodes in row B to the nodes in row C. Twenty diagonal paths connect the nodes in row B to the respective nodes in row C two positions to the right. The rightmost node in row B is connected to the node in row C in column 18. The node in column 1 of row B is connected to the node in column 19 of row C. If the vertical paths are used rather than the diagonal paths the bit pattern transmitted to the nodes in row C is the same as that originally appearing at the nodes in row B. If, on the other hand, the diagonal paths are used the bits at the nodes in row C are the same as those at the nodes in row B except that they have been rotated two positions to the right.

Similarly 20 vertical paths are provided between the nodes in rows C and D, the nodes in rows D and E, and the nodes in rows E and F. The diagonal paths between nodes in rows C and D connect to each other nodes which are four columns apart. The diagonal paths between the nodes in rows D and E separate nodes which are eight columns apart, and the diagonal paths connecting the nodes in row E to the nodes in row F are connected between nodes which are 16 positions apart. Either the vertical or the diagonal paths are used in transmitting bits from the nodes in row C to those in row D, from the nodes in row D to those in row E, and from the nodes in row E to those in row F. If the diagonal paths are used in the input bits are rotated 4, 8 or 16 positions to the right. By selecting the appropriate groups of diagonal paths the input data word may be rotated the desired amount to the right. The rotated data word appears at the nodes in row F for transmission within the data processor. By merely controlling either the vertical or the diagonal paths between any two rows of nodes to transmit the bits over them the input data word may be rotated to the right while it is transmitted through the network. If all of the transmission paths comprise transistor gates the delay through the network is merely that required for five transistors to turn on or off in sequence.

A more specific object of my invention concerns the shifting and rotating of a data word in either direction by the use of circuitry which is capable of rotating the data word in only one direction. The obvious advantage of such circuitry is that the total cost of the shift and rotate circuit may be cut by a factor of approximately one half.

Consider a 20-bit register containing a 20-bit data word. Suppose that a prior art shift and rotate circuit used in conjunction with the register for shifting its contents is capable of only rotating the bits in the register to the right. The circuit may also be used for shifting the data word to the right. It is only necessary to block the bits shifted out of the right end of the register from re-entry in the left end of the register. This circuit may also be used for rotating the register word to the left. It is only necessary to complement the shift magnitude with respect to 20 and then rotate the register word to the right a number of positions equal to the complemented value. For example, a left rotation of five positions is equivalent to a right rotation of 15. The only one of the four types of operation which remains to be accomplished is a left shift. Suppose the shift magnitude is again complemented with respect to 20 and the register word rotated to the right a number of positions equal to the complemented value. This will place the desired bits in the correct register position. If specific examples are considered it will become apparent that the bit values which must be erased from the register, i.e., the bits for which 0's are to be substituted in the register, are not those which are rotated out of the right end of the register, but rather those which are not rotated out of the register at all. While right rotation circuitry may be used for accomplishing right shifts by blocking the bits which are rotated out of the right end of the register from re-entry at the left end, a similar technique may not be used to control left shifts. The bits which must be blocked are those which are never rotated out of the register in the first place and the desired bits are those which are rotated out of the right end of the register and re-enter at the left end. For this reason prior art shift and rotate circuits have included circuitry for rotating to the left as well as to the right. Shifts, in either direction are obtained by blocking the bits which leave one of the ends of the register.

According to an aspect of my invention however it is possible to shift to the left with the use of right rotation circuitry in addition to rotating in either direction and shifting to the right. The diagonal transmission paths connecting nodes in the rightmost columns to nodes in the leftmost columns merely need be blocked to control right shifts—the bits shifted out of the right end of the system are not reinserted at the left end. Left rotations may be accomplished by complementing the given shift magnitude with respect to 20 and then rotating to the right the complemented number of positions. As for left shifts, they may also be controlled by unconditionally blocking certain vertical transmission paths on left shifts in certain situations, and conditionally blocking other vertical paths on left shifts in other situations. The determination of which paths must be blocked is too detailed to be briefly described at this point. Suffice it to say that by merely blocking certain of the vertical transmission paths in the right rotation circuitry and by then rotating to the right a number of positions equal to the complemented value of the shift magnitude, the data word transferred through the combinational logic circuit appears at the output nodes shifted to the left the required number of positions. The principles which control the determination of which transmission paths must be blocked for accomplishing left shifts may also be applied to the prior art type of shift and rotate circuit for cutting the cost by a factor of approximately one half. The application of these principles to prior art systems will become apparent to those familiar with the art after reading the detailed description below.

It is a feature of my invention to provide a combinational logic circuit for operating upon a data word while it is being transferred within a data processor.

It is a further feature of my invention to control the shifting and rotating of data words in either direction with the use of unidirectional rotating circuitry, with certain operations of the unidirectional rotating circuitry being inhibited to accomplish shifts in the direction opposite to that in which the unidirectional rotating circuitry is operative.

Further objects, features and advantages of the invention will become apparent upon consideration of the following detailed description in conjunction with the drawing in which:

FIG. 8A is a detailed schematic of an illustrative gate, shown symbolically in FIG. 8B, which may be used in the block diagram circuit of FIGS. 9–16, and FIG. 8C depicts the operation of the gate for various input conditions;

FIGS. 17 and 18 depict the transmission characteristics of certain ones of the gates in FIGS. 9–16; and FIGS. 19 and 20 show respectively the arrangements of respective FIGS. 4–7 and FIGS. 9–16.

*Data processor incorporating a combinational logic shift and rotate circuit (FIG. 1)*

Figure 1:
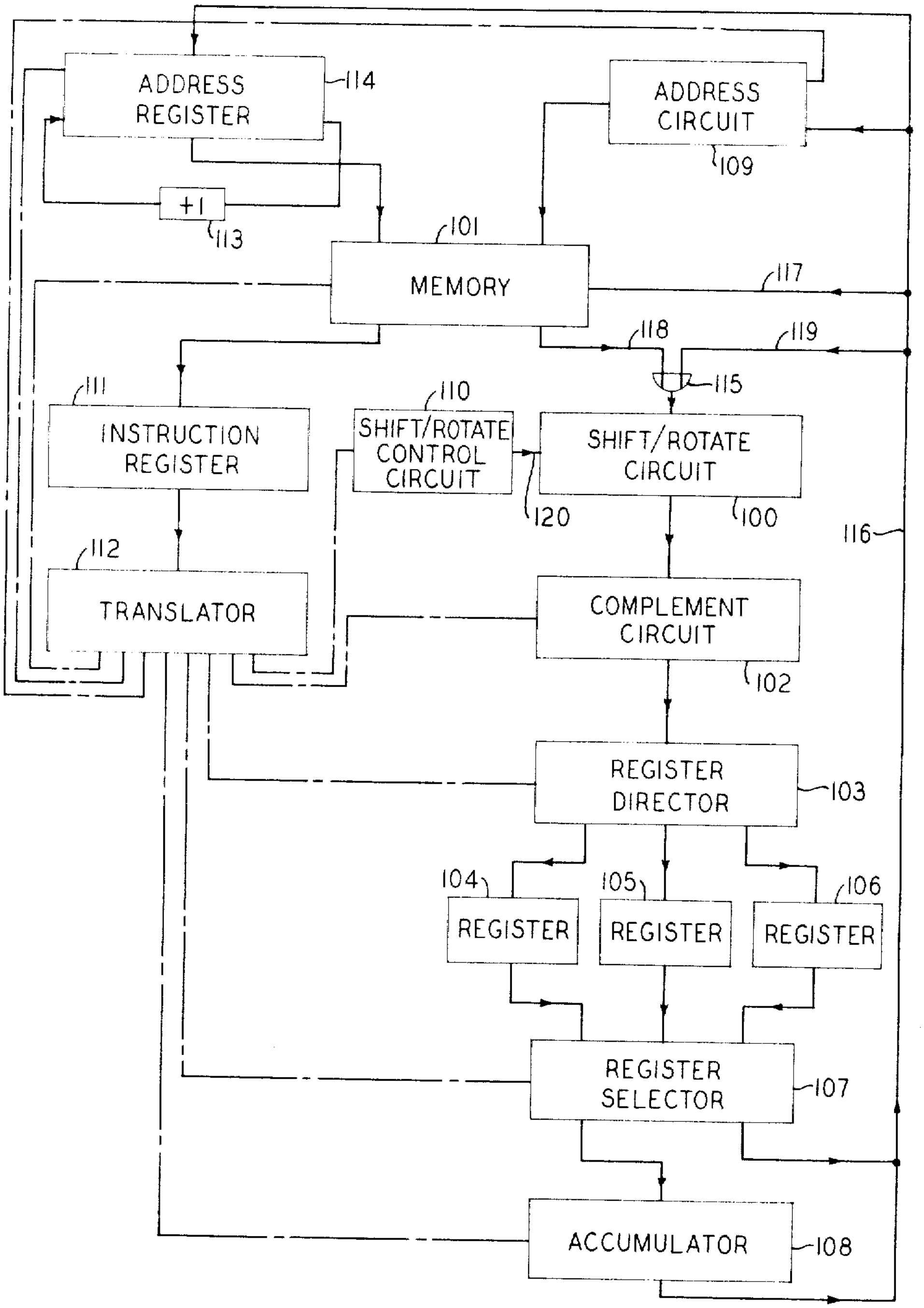
FIG. 1 is a block diagram of a data processor incorporating the combinational logic shift and rotate circuit of my invention.

FIG. 1 is a block diagram schematic of a data processor incorporating a combinational logic shift and rotate circuit. Memory 101 includes both instruction words and data words. Address register 114 contains the address of the instruction word to be transmitted from memory 101 to instruction register 111. The instruction word in register 111 is translated by translator 112 to determine the required operation of the system. The translator includes a series of output cables extended to various units in the system, the translator controlling the operation of these units in accordance with the instruction word contained in the instruction register.

Address circuit 109 contains the address of the location in memory 101 into which a data word on cable 117 is to be written, or out of which a data word is to be read and applied to cable 118. The operation of memory 101 is controlled by the output cable extended from translator 112 to the memory. The signals on this cable indicate whether an instruction word is to be transmitted to the instruction register, or whether a data word is to be written into or read out of the memory.

Data words on either cable 118 or cable 119 are transmitted through OR gate 115 to shift and rotate circuit 100. Translator 112 transmits to S/R control circuit 110, over the respective output cable, signals indicative of the type of operation required, its direction and magnitude. S/R control circuit 110 controls shift and rotate circuit 100 to shift or rotate the data word appearing at the output of OR gate 115. The resulting data word is transmitted to complement circuit 102 which under control of translator 112 is capable of complementing each bit in the data word at the output of shift and rotate circuit 100. The data word is then transmitted to register director 103. Translator 112 controls register director 103 to direct the data word to a selected one of registers 104, 105 and 106.

Register selector 107, under control of translator 112, is capable of reading the data word stored in one of registers 104, 105 and 106 and transmitting it to either accumulator 108 or directly to bus 116. If the word is transmitted to accumulator 108 it is operated upon by the accumulator in accordance with commands received from translator 112. For example, the accumulator may add two data words successively transmitted to it. The sum may be then applied to bus 116.

The data word on bus 116 may control one of a variety of operations. For example, the data word may be transmitted through OR gate 115, shift and rotate circuit 100, complement circuit 102 and register director 103 to one of registers 104, 105 and 106. The data word in one of registers 104, 105 and 106 would be read by register selector 107 and applied to bus 116 to be transmitted in the above manner when it is desired for example to transfer a data word from one register to another and at the same time control its shifting. The data word on bus 116 also appears on bus 117. The data word may be written in memory 101 at the address specified by address circuit 109. If the data word on bus 116 is not data but only represents an address in memory 101, address circuit 109 is controlled by translator 112 to write another data word in the memory at the location represented by the address on bus 116. Similarly the data word on bus 116 might represent the location in the memory of a data word to be read out of the memory and applied to cable 118. Finally, the data word on bus 116 may be transmitted directly to address register 114 to replace the contents of the address register. Such an operation would be effected when it is necessary to transfer to a new instruction sequence. Ordinarily, increment circuit 113 controls the incrementing of the address in register 114 but an out-of-sequence address may be written in the register when such an operation is controlled by translator 112. The particular operation performed in the machine is determined by the operation of the translator.

The details of the data processor are not disclosed since the shift and rotate circuit of my invention may be incorporated in any data processor of the type described. An illustrative data processor is disclosed in the Doblmaier et al. application, Ser. No. 334,875, filed Dec. 31, 1963. The details of the data processor in which the shift and rotate circuit of my invention is incorporated are not necessary for an understanding of my invention. What must be understood is the placing of the shift and rotate circuit 100 itself within the data processing system. It will be observed that any word transferred from memory 101 to one of registers 104, 105 and 106 passes through the shift and rotate circuit. Similar remarks apply to a data word transferred from one of the registers to another. By placing the shift and rotate circuit, which as distinguished from prior art circuits is comprised of combinational logic elements, in the transfer path of a data word it is possible to control the shifting or rotating of the word while it is being transferred within the system. Unlike prior art a shift and rotate circuit is not directly connected to one or all of registers 104, 105 or 106 or accumulator 108. It is not necessary to place a data word in a register before shifting it. A data word may be shifted while it is being transferred from one part of the system to another.

*Principles of operation for a 16-bit shift and rotate circuit (FIG. 2)*

Figure 2:
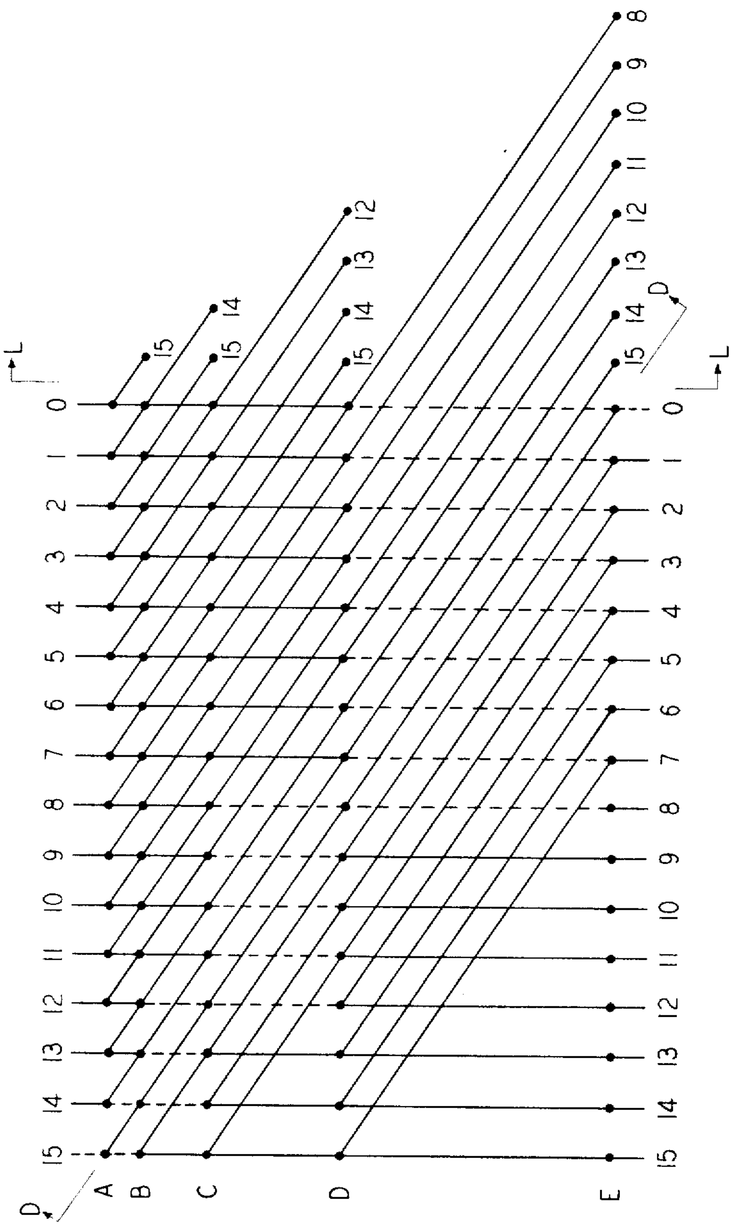
FIG. 2 depicts the principles of operation of the shift and rotate circuit of the invention for a data processor in which data words are 16 bits in length.

FIG. 2 represents the transmission paths required in a shift and rotate circuit which operates on 16-bit data words. The circuit includes five rows A–E and 16 columns 15–0 of nodes. A node is merely a point, e.g., a designated spot on a conductor. Each of the nodes in the drawing may be identified by first giving its column number and then its row letter. For example node 7D is contained in column 7 and row D. A line, vertical or diagonal, between any two nodes represents a transmission path. The bit value at any node is transmitted either along the vertical path to the node in the next row in the same column, or along a diagonal path to a node in the next row but to the right. The choice between the vertical and diagonal paths is made dependent upon the magnitude of the required shift and, for any given time at which the circuit is used, and at any given set of lettered nodes, all bit positions use the same choice of vertical or diagonal paths to connect to the next set of lettered nodes.

Certain nodes in the drawing are duplicated. For example, node 14D appears twice in row D. The two nodes are really the same. Thus the bit at node 2C may be transmitted to the same physical point as the bit at node 14C, the diagonal path being taken in the first case from node 2C and the vertical path being taken in the second from node 14C. The diagonal paths to the right of the drawing are not shown extended back to the left to the respective nodes in order that the operating principles of the circuit be more apparent. But it is to be borne in mind that all nodes to the right of line L—L are duplicated, that is, they are physically connected to the respective identically labeled nodes to the left of L—L.

There are 16 input conductors to the shift and rotate circuit, which are connected to respective ones of the nodes 0A through 15A. The 16-bit input data word thus appears at the top row of nodes. The bits at the top row of nodes are all transmitted either vertically or diagonally to the 16 nodes in row B. The bits thus transmitted to the nodes in row B are then all transmitted vertically or all transmitted diagonally to the nodes in row C. The bits are then similarly transmitted to the 16 nodes in row D and finally transmitted to the 16 nodes in row E. The 16 nodes in row E are connected to 16 output conductors which are extended to complement circuit 102 in FIG. 1. The shifted 16-bit data word appears on these 16 conductors.

FIG. 2 merely depicts the circuitry which must be designed to implement a 16-bit shift and rotate circuit in accordance with the principles of the invention. The two illustrative embodiments of the invention are 20-bit shift and rotate circuits. Nevertheless the switching plan for a 16-bit system is first considered in order that the principles of the invention be most clearly understood. The vertical and diagonal lines in FIG. 2 represent transmismision paths which must be included in the final design. The control of these paths is determined by a "steering" word represented as (X8) (X4) (X2) (X1). The four bits of this steering word will determine the paths of data bits through the network of FIG. 2, hence they serve the function of "steering" data through the circuit. Any rotation to the right having a magnitude from 0 to 15 may be represented by the steering word. For example, if the word (X8) (X4) (X2) (X1) is 1001 the shift magnitude is nine. The X1 bit in the steering word controls the operation of the gates connecting the nodes in row A to the nodes in row B. If X1 is a 0 the 16 vertical gates operate and the bits at nodes 0A through 15A are transmitted vertically to respective nodes 0B through 15B. If X1 is a 1 the bits at nodes 0A through 15A are transmitted along the 16 diagonal paths to respective nodes 15B through 14B (the expression "nodes 15B through 14B" represents the node sequence 15B, 0B, 1B . . . 14B). The X1 bit in the steering word thus controls the shifting of the 16 bits at the nodes in row A to the right by one position if required. If a shift of one position is not required the bits are merely transmitted downward to the next row of nodes.

Similar remarks apply to the 16 vertical gates extending from the 16 nodes in row B and the 16 diagonal gates extending from these same nodes. (It will be noted that there are no paths from node 15B at the right end of row B because this node is the same as node 15B at the left end of the row, at which node two transmission paths originate.) The choice between the vertical paths and the diagonal paths is dependent upon the value of X2 in the steering word. If the bit is a 0 the vertical paths are chosen and if it is a 1 the diagonal paths are used. Bit X2 thus controls the shifting of each of the bits at the nodes in row B two positions to the right.

The 16 vetrical and 16 diagonal paths connected between the nodes in row C and the nodes in row D are controlled by bit X4 in the steering word. The vertical paths are chosen if bit X4 is a 0 and the diagonal paths are chosen if the bit is a 1. If the diagonal paths are chosen the 16 bits in row C are transmitted to the 16 nodes in row D after being rotated four positions to the right. Similar remarks apply to the last group of 32 transmission paths and bit X8, this bit controlling the rotation of the 16-bit data word eight positions to the right.

The transmission paths in FIG. 2 accomplish the right rotation of a data word in accordance with the magnitude of the shift required. For example, suppose the 16-bit data word appearing at the 16 nodes in row A must be rotated 11 positions to the right. The steering word will in this case be 1011. Bit X1 controls the rotation of all bits one position to the right. The bits thus appear at the 16 nodes in row B after having been rotated one position to the right. Bit X2 then controls the rotation of the 16 bits at the nodes in row B two positions to the right, the diagonal paths being being used for transmitting the bits from the nodes in row B to the nodes in row C. Since bit X4 is a 0 the vertical paths are used to transmit the bits from the nodes in row C to the nodes in row D. Finally since bit X8 is a 1 the 16 diagonal paths are used to transmit the bits at the nodes in row D to the nodes in row E. The final 16-bit data word appearing at nodes 0E through 15E is the same as the input data word having appeared at nodes 0A through 15A except that the bits have been rotated 11 positions to the right. The switching plan of FIG. 2 is used as a basis for the design of the actual shift and rotate circuit to be used in a 16-bit data word system. Each bit in the steering control word controls the selection of either a respective group of 16 vertical paths or a respective group of 16 diagonal paths, all of the paths being represented in the drawing only by lines.

A circuit design based on the pattern of FIG. 2 would be capable of accomplishing right rotation operations in the manner just described. Since each line represents a gate or a transmission path it is apparent that an input data word from a register or from memory may be rotated to the right as it travels through the shift and rotate circuit on its way to another storage unit such as a register. Additional control functions are required however to accomplish shifts to the right, and shifts and rotations to the left. To control the shifting of the input data word to the right it is only necessary to block all of the diagonal paths which cross the line L—L. These diagonal paths, such as 0A–15B and 1B–15C, control the transmission of a bit from a node at the right end of the circuit to a node at the left end. During a shift operation the bits should be shifted out of the system. This operation may be effectively accomplished by blocking all diagonal paths crossing the line L—L when a right shift is performed and by also forcing the writing of a 0 at any node at which one of these diagonal paths is terminated. For example, consider that the 16-bit input data word is to be shifted 11 positions to the right rather than being rotated this amount as in the example previously considered. Since X1 is once again a 1 the 16 diagonal paths connecting the nodes in row A to the nodes in row B are selected. However, transmission path 0A–15B is blocked and also a 0 is automatically written at node 15B. (The term "written" merely refers to the fact that the potential at node 15B represents a 0. The bit value at any node is represented by one of two potentials. The potentials at the nodes together with the steering word and other control signals govern the operations of the various gates in the system.) Thus the bits at nodes 15A through 1A are shifted to respective nodes 14B through 0B. A 0 appears at node 15B. Because bit X2 is also a 1 the 16 diagonal gates connecting the nodes in row B to the nodes in row C are chosen. The two diagonal paths 0B–14C and 1B–15C are blocked during right shifts since these paths cross the line L—L. 0's are automatically written at nodes 15C and 14C. The 0 previously written at node 15B is transmitted along diagonal 15B–13C to node 13C, and 0's thus appear at the three nodes 15C through 13C. The bit values at nodes 12C through 0C are derived from respective nodes 14B through 2B.

Bit X4 in the shift magnitude word is a 0 and consequently the 16 vertical paths connecting the nodes in row C to the nodes in row D are chosen. Whenever bit X4 is a 1 during a right shift paths 0C–12D through 3C–15D are blocked since these four paths cross the line L—L. In the present case since bit X4 is a 0 the 16 bits at the nodes in row C are merely transmitted directly down to the 16 nodes in row D. 0's thus appear at nodes 15D through 13D. Nodes 12D through 0D contain bit values dependent upon the bit values in the original input data word.

During the last step because bit X8 is a 1 the last group of diagonal paths is chosen rather than the corresponding vertical paths. The eight paths 0D–8E through 7D–15E are blocked since these paths cross the line L—L. 0's are automatically written at nodes 15E through 8E. The three 0's at bits 15D through 13D are shifted diagonally to respective nodes 7E through 5E. The bit values at nodes 4E through 0E are the only ones in the final word whose values depend on the five respective bits 11 positions away to the left in the original input data word. It is thus seen that right shifts may be accomplished with the use of right rotation circuitry, provided the transmission paths crossing the line L—L are blocked.

Consider now a rotation to the left. Any input data word may be rotated to the left the required number of positions if it is instead actually rotated to the right a number of positions equal to the input magnitude complemented with respect to the number of bits in the data word which in this case is 16. Suppose it is necessary to rotate the input word five positions to the left. The shift magnitude actually required is 0101. This word is complemented with respect to the number 10000 (binary 16). The result 1011 is the magnitude of the right rotation actually performed and hence this value is used as the steering word to control the paths in FIG. 2. Rotating the input word 11 positions to the right produces a result which is identical to the one which would have resulted had the input word been rotated five positions to the left. Thus right rotation circuitry may be used to perform left rotation. All that is required is that the shift magnitude first be complemented with respect to 16 before using it as the steering word to control the actual (right) rotation.

The fourth operation which must be considered is a left shift. As described above it has heretofore been believed that right rotation circuitry could not be used to accomplish left shifts. In accordance with an aspect of my invention however the right rotation circuitry may be used to accomplish left shifts with surprisingly few additional control functions. Although little additional circuitry is required the analysis may be quite complicated in any given system and for this reason the 16-bit case will be considered in detail at this time.

Throughout the remainder of this specification when a path is said to be "blocked" it shall mean that any binary data bit, with either a 1 or a 0 bit value, shall look to the remainder of the circuit as if it had a bit value 0 if it attempts to use the "blocked" path. If the circuit paths are made up of metallic contacts, for example, and a binary 1 is represented by electrical continuity through the contacts and a binary 0 is represented by a lack of such continuity, then the "blocking" of a path would merely consist of breaking the electrical continuity of the path.

For performing left shifts with right rotation circuitry the proper steering word may once again be obtained by first complementing the given shift magnitude with respect to 16. By then rotating the input data word to the right a number of positions equal to this complemented value, the input data word will be given the effect of being rotated the proper number of positions to the left. But during a shift operation 0's must be written at one of the ends of the output word. For right shifts 0's may be easily written at the nodes at the left end of the system merely by blocking the diagonal paths which cross the line L—L. But a similar blocking technique for left shifts is difficult to envision because the bits which cross the line L—L must remain in the system when the input data word is shifted to the left and those bits which do not cross line L—L must be forced to be 0's at the output nodes. For example, consider an input data word which consists of 16 1's. Suppose the magnitude given for the left shift is 5. The final data word at the nodes in row E should be 1111111111100000. If the input data word is rotated 11 positions to the right the 11 lead significant bits in the input word cross the line L—L and appear in the 11 most significant positions in the final word. It is only the five bits which do not cross the line L—L which must be made 0's during the course of their transmission through the system in order that the five least significant bits in the final word be all 0's. The changing of these five bits to 0's appears difficult because these five bits never cross the line L—L and it is not obvious that a particular group of diagonal paths may be blocked such as in the case of a right shift.

The starting point in the analysis is the following principle, which may be deduced from the discussion immediately above: A left shift operation may be performed if the magnitude of the left shift called for is complemented with respect to 16 and then right transmission through the network is allowed only for those data bits which cross the line L—L. If somewhere in the circuit network 0's are substituted for the bits which do not cross L—L, 0's will appear, as required, at the rightmost nodes in row E.

The diagonal line D—D is superimposed on the path 15A–0E, this latter path actually comprising four distinct transmission paths. All vertical paths passing through the line D—D, and all vertical paths which terminate at a node along the line D—D are dotted in FIG. 2. Thus the path 0D–0E and the output path which goes downward from node 0E are dotted because they terminate at a node along line D—D. The seven vertical paths 1D–1E through 7D–7E are dotted because they cross the line D—D. The two vertical paths 8C–8D and 8D–8E are dotted because they each terminate at node 8D which is along the line D—D. The three vertical paths 9C–9D through 11C–11D are dotted because they cross the line D—D. The two vertical paths 12B–12C and 12C–12D are dotted because they each terminate at node 12C through which line D—D passes. Vertical path 13B–13C is dotted because D—D passes through it. The two vertical paths 14A–14B and 14B–14C are dotted because they each terminate at node 14B which lies along D—D.

Vertical path 15A–15B and the vertical path from the memory or register connected to node 15A, over which the most significant bit is transmitted to the shift and rotate circuit, are also dotted because they each terminate at node 15A which lies along D—D.

Once the dotted vertical paths are determined a left shift may be accomplished with the use of right rotation circuitry in a surprisingly simple manner. All that is required is that the left shift input magnitude be complemented with respect to 16 and the input data word then be rotated to the right a number of positions equal to the complemented value—with all of the dotted vertical paths (or more accurately the final network transmission paths represented by the dotted vertical paths) being blocked, i.e., the nodes at the lower end of each of the paths having 0's automatically written at them when respective vertical steps are taken. By absolutely blocking the dotted vertical paths when a left shift operation is to be performed 0's will automatically appear in the required number of rightmost nodes in row D. The blocking of the vertical paths which cross the diagonal D—D has the effect of forcing data bits to cross line L—L if they are to find their way through the circuit unimpeded (i.e., without encountering a blocked path).

In order to design a shift and rotate circuit for other than 16-data words it is necessary to clearly understand why blocking the dotted vertical paths in FIG. 2 insures that 0's appear in the correct number of rightmost nodes in row E after the input data word is transmitted through the network. The selection of the vertical paths to be dotted is based on the fundamental principle given above. By blocking the vertical paths represented by the dotted lines it is guaranteed that 0's will be substituted for those bits in the original data word which do not cross the line L—L by the time they reach the nodes in row E.

The vertical paths in FIG. 2 fall into three groups, the dotted paths along D—D, the vertical paths to the upper right of the dotted paths, and the vertical paths to the lower left of the dotted paths. The key to the vertical path scheme is to insure that a 0 is substituted for any bit which cannot cross L—L during transmission through the network. Consider first the bits at the nodes at the upper right of the network. The bit at node 0A crosses L—L if a diagonal step of one is taken. However if a vertical step is taken and the bit is transmitted to node 0B it may still subsequently cross L—L if a step of 2, 4 or 8 along a diagonal is taken. Consequently the vertical path connecting node 0A to node 0B should not be blocked. A 0 should not be substituted for the bit at node 0A even if a vertical step is taken because the bit may subsequently cross L—L and should therefore remain in the system. Consider another node, for example, node 7C. By the time the bit appears at node 7C there has been a shift of at most three positions to the right. The bit at node 7C therefore has not yet crossed L—L. The bit at node 7C may cross L—L whether the diagonal step is taken to node 3D or the vertical step is taken to node 7D. In either case the bit originally at node 7C may yet cross L—L, if the next shift of 8 is along diagonal 7D–15E or 3D–11E. Consequently the vertical path from node 7C should not be blocked, i.e., a 0 should not be substituted for the bit at node 7C, even if the vertical path 7C–7D is taken because the bit may yet cross L—L if a diagonal step of 8 is taken.

Consider now the nodes at the top of the dotted vertical paths beginning with the group of nodes 0D through 8D. By the time the original bits at the nodes in row A are transmitted to the nodes in row D a maximum shift of seven positions may have taken place. The only bits at the nodes in row D which may have already crossed L—L are those at nodes 15D through 9D, the seven leftmost nodes in the row. In no way whatsoever can the bits at nodes 8D through 0D have already crossed L—L. If these bits take the vertical paths downward from row D they will not have crossed L—L by the time they appear at the output nodes 8E through 0E. In this event these bits will not have crossed L—L and they should appear as 0's in the final word. For this reason if X8 in the shift magnitude word is a 0 the bits at nodes 8D through 0D should not be transmitted through the system and 0's should be substituted for them. A blocked vertical path results in a 0 being written at the node at the bottom of the vertical path. Thus if X8 is a 0, 0's are automatically written at nodes 8E through 0E.

Consider now the nodes in row C. The vertical paths downward from nodes 7C through 0C should not be blocked because even if the bits at these nodes take these vertical paths they may still cross L—L if X8 is a 1. But the same is not true of nodes 12C through 8C. When the step of 4 is about to be considered the maximum shift through the network thus far has been 3. Consequently bits which have already crossed L—L may appear at nodes 15C through 13C. But the bits at nodes 12C through 0C can in no way have already crossed L—L. The bits at nodes 7C through 0C need not be controlled as explained above. This leaves only the bits at nodes 12C through 8C. If the bits at these nodes take a vertical step from row C, thus appearing at nodes 12D through 8D, the bits cannot cross L—L even if the diagonal step of 8 is next taken. The furthest that any one of these bits can get is to node 0E. Since the bits at nodes 12C through 8C have not yet crossed L—L and can in no way cross L—L if X4 is a 0 the vertical paths from nodes 12C through 8C are blocked. If X4 is a 0, 0's are automatically written at nodes 12D through 8D.

Consider next the nodes in row B. No control need be exerted over the bits at nodes 11B through 0B. The bits at these nodes may subsequently cross L—L even if they take vertical steps from the nodes in row B to the nodes in row C. Even the bit at node 11B may cross L—L after a vertical step to node 11C is taken if bits X4 and X8 are 1's. Consequently no control need be exerted over the bits at nodes 11B through 0B.

When the step of 2 positions is about to be considered the maximum shift that may have already been taken is 1. Consequently, the bit at node 15B may already have crossed L—L, the bit having come from node 0A. But the bits at nodes 14B through 12B cannot yet have crossed L—L and if these bits take vertical paths at row B there is no chance that they will subsequently cross L—L even if X4 and X8 are 1's. Even the bit at node 12B cannot cross L—L if it is transmitted vertically down to node 12C. If X4 and X8 are both 1's this bit may progress no further than to node 0E. Since the three bits at nodes 14B through 12B cannot cross L—L if X2 is a 0 the three respective paths are blocked. By blocking these paths and automatically writing 0's at nodes 14C through 12C these bits will appear as 0's in the final data word.

Consider next the nodes in row A. The bits at nodes 13A through 0A may cross L—L even if X1 is a 0. For example, the bit at node 13A, even if transmitted vertically to node 13B, may still cross L—L if X2, X4 and X8 are all 1's. For this reason no control need be exerted over the bits at nodes 13A through 0A. But nodes 15A and 14A must be controlled. If X1 is a 0 the two most significant bits in the system would attempt to be transmitted to nodes 15B and 14B. These bits then can in no way cross L—L even if X2, X4, and X8 are all 1's. At most the bit at node 14B can progress to node 0E. Consequently the two vertical paths 15A–15B and 14A–14B are blocked during the left shift operation. Thus if the complemented shift magnitude word contains a 0 for the X1 bit 0's must be automatically written at nodes 15B and 14B.

It will be noted that the vertical line to the top of node 15A is also dotted. The maximum right rotation magnitude which may be specified is 15. Consequently the bit at node 15A can never cross L—L since it can progress to at most node 0E. The minimum magnitude which may be specified on a left shift is 1. If a left shift of 1 is specified the data word is rotated to the right 15 positions. By always writing a 0 at node 15A (the dotted vertical path to the top of node 15A represents the automatic writing of a 0 at node 15A when a left shift operation is performed), a 0 will then appear at node 0E. This is required since it is obvious that on any left shift, other than the trivial case of a left shift of zero places, a 0 must appear in at least the least significant position of the final data word. For this reason the output path downward from node 0E is blocked for left shift operations.

Thus by blocking all of the dotted vertical paths it is guaranteed that 0's will be substituted for any bits which appear at the nodes at the top of these paths which have no chance of crossing L—L. The nodes in the group at the upper right of the network need not be controlled since the bits at these nodes may cross L—L even if vertical steps from these nodes are taken. The only nodes that remain to be considered are those to the lower left of the dotted vertical paths, namely nodes 15E through 1E, 15D through 9D, 15C through 13C, and 15B. The bits at these nodes also need not be controlled. If a 0 appears at one of these nodes it need not be controlled since to block vertical transmission would also result in a 0 being transmitted through the network. And if the bits at these nodes are 1's they must have already crossed L—L and consequently should remain in the network. The bit at node 15C, for example, cannot have come from node 15A since the bit at node 15A is always a 0 on left shifts. If the bit at node 15C is a 1 it must have come from node 0A after a diagonal shift of 1 and a vertical step of 2, from node 1A after a vertical step of 1 and a diagonal shift of 2, or from node 2A after diagonal shifts of both 1 and 2. In any case the bit at node 15C has already crossed L—L and need not be controlled at node 15C. Similarly, any 1's appearing at the other nodes must have already crossed L—L and, since they should remain in the system, the vertical paths from these nodes should not be blocked.

(It should be noted that in the particular example of FIG. 2 shifts and rotations of 16 are not permitted since the maximum value of the steering word is 15. Also, if a circuit is designed for a 16-bit system based on FIG. 2 arrangements must be made for the trivial case in which a shift magnitude of 0 is specified on a left shift or rotation operation. The complement of 0 with respect to 16 is 16 and the network is capable of a maximum rotation of only 15. Provision must be made for these cases if a 16-bit circuit is constructed. The additional circuitry required will be apparent to those skilled in the art, especially after the more complicated case of a 20-bit system is considered below. The 16-bit network plan is being described primarily because without this foundation an understanding of the 20-bit system scheme is exceedingly difficult.)

The 16-bit case is a relatively simple one. The right rotation circuitry is used and no paths are blocked on rotations to both the right and the left, with the given shift magnitude being complemented in the latter case before the left rotate operation is actually effected by means of a right rotate operation. A right shift is accomplished by controlling an ordinary right rotate operation but with the diagonal paths crossing L—L being blocked, i.e., 0's being written at the nodes at the ends of these paths whenever the steering control word indicates that these paths should be taken. Finally, a left shift may be accomplished by first complementing the given shift magnitude and then performing a right rotate operation with the dotted vertical paths being blocked. By blocking the dotted vertical paths unconditionally in the case of a left shift it is guaranteed that the only 1's in the original data word which are transmitted all the way through the network to the nodes in row E are those which cross L—L.

What the preceding analysis has shown is that in FIG. 2 (and any like network where the number of bits in the data word is an integer power of two) there conveniently exist three non-overlapping sets of nodes and paths as follows: the set of nodes and paths typical of those in the upper right portion of FIG. 2 which includes all those nodes and paths which may be used by data bits prior to crossing line L—L; the set of nodes and paths typical of those in the lower left portion of FIG. 2 which includes all of those nodes and paths which may be used after data bits have crossed line L—L; and the set of nodes and paths typical of those on the diagonal in FIG. 2 which belong to neither of the two prior mentioned sets and which are in no case needed by any data bit prior to crossing line L—L nor any data bit which has crossed line L—L. This latter set in FIG. 2 consists of all the dotted paths, all of the nodes with dotted paths above and below them, and the diagonal paths along line D—D from node 15A to node 0E. Although all of the dotted vertical paths were assumed to be blocked in the preceding discussion, a sufficient technique for using the network of FIG. 2 to accomplish the left shift operation is to block a subset of the dotted vertical paths along line D—D, such subset being chosen so that each input data bit is forced to cross line L—L if it is to proceed through the entire network without being blocked. At least two such subsets of paths exist in FIG. 2. One consists of the dotted paths which intersect a line parallel to and just below line D—D. Another such subset consists of the dotted paths which intersect a line parallel to and just above line D—D.

In the 16-bit case a subset of the dotted vertical paths are blocked *unconditionally*. These paths are never operative when a left shift operation is being performed. In fact, in any system where the number of bits is a power of 2 and the shift magnitude word is of the form . . . (X32)(X16)(X8)(X4)(X2)(X1) a network similar to that shown in FIG. 2 may be drawn with little difficulty. The line D—D is drawn straight through the two nodes in the upper left and lower right corners. All vertical paths passing through D—D and all vertical paths which terminate (either at the top or bottom) at a node falling on line D—D are dotted. A suitable number of these vertical paths are unconditionally blocked on all left shifts and no additional control need be exerted to insure that the only 1's which are transmitted through the system are those which cross L—L, i.e., those which should not be replaced by 0's at the right end of the final word. The more difficult situation is that in which the number of bits in a data word is not a power of 2. In such a case some of the vertical paths may not be unconditionally blocked. In certain cases these paths must remain open, i.e., the "dotted" vertical paths must transmit 1's down them, under special circumstances. For an appreciation of the more complicated situation attention is now directed to FIG. 3 which shows the network for a 20-bit system.

*Principles of operation for a 20-bit shift and rotate circuit (FIG. 3)*

Figure 3:
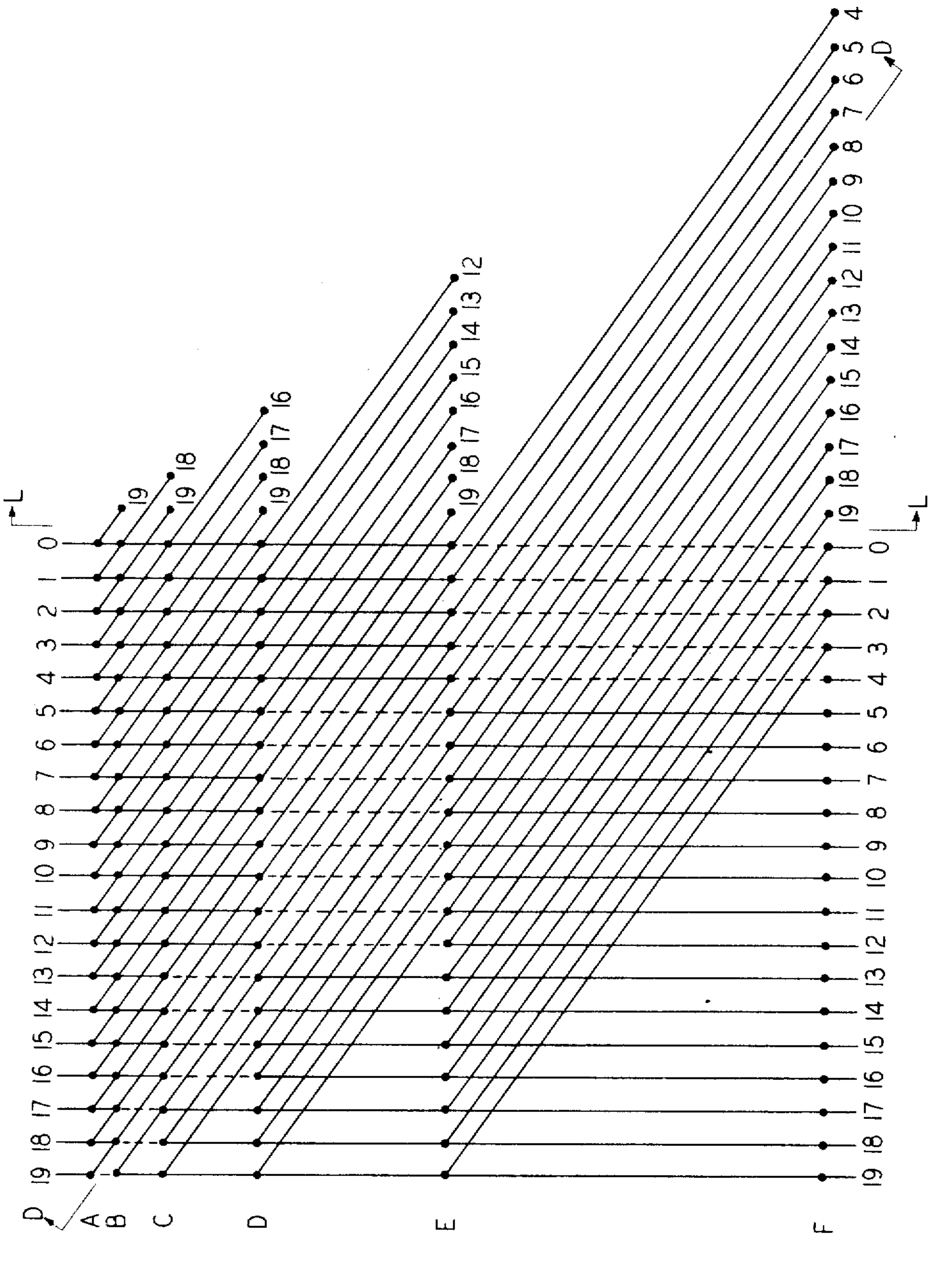
FIG. 3 depicts the principles of operation of the shift and rotate circuit of the invention for a data processor in which data words are 20 bits in length.

It is assumed that the 20-bit shift and rotate network of FIG. 3 shall be required to accept commands to shift or rotate either left or right with any specified input shift magnitude from 0 through 20 places. Input shift magnitudes of greater than 20 positions are assumed to be of no interest and not allowed as a valid input command.

A five-bit shift magnitude word is required to specify one of the numbers 0–20. The steering word is thus represented as (X16)(X8)(X4)(X2)(X1). An additional group of vertical and diagonal transmission paths are used to control transmission from the nodes in row E to the nodes in row F. Shifts are accomplished in steps of 1, 2, 4, 8 and 16. FIG. 3 is to be interpreted in the same manner as FIG. 2. Transmission paths are provided for transmitting bits either vertically or diagonally to the right, these paths being the only ones required to control all four possible operations.

The operation of a 20-bit system when a 20-bit data word is to be rotated to the right is straightforward. For example, to rotate the word 19 positions to the right the input shift magnitude word is used as the steering word and is 10011. The diagonal gates which are operated are those coming from the nodes in rows A, B and E. The vertical paths which are used are those originating at the nodes in rows C and D. The final rotated data word appears at nodes 19F through 0F. To rotate to the left the shift magnitude is complemented with respect to 20 and the data word is then rotated to the right a number of positions equal to the complemented value. For example, to rotate one position to the left the shift magnitude 00001 is first complemented with respect to 20. The resulting steering word 10011 (decimal 19) is then used to control the right rotation. To shift to the right it is only necessary to block all diagonal paths crossing L—L. By then controlling the automatic writing of 0's at any node at which a diagonal path crossing L—L terminates, it is insured that 0's appear in the proper number of the leftmost nodes in row F. To control a left shift in a 20-bit system using right rotation circuitry is not as simple however as in the 16-bit case. The reason for this is that the vertical paths crossing the line D—D cannot in all cases be unconditionally blocked. Further analysis is required to determine which vertical paths must be blocked to accomplish a left shift.

In the 16-bit network of FIG. 2 there conveniently existed a set of dotted vertical paths which were never needed by data bits which had already crossed line L—L nor by data bits which would cross L—L at later stages of the network. This set of dotted paths was large enough that a subset of them could be chosen in such a manner that blocking this chosen subset for left shift operations would force data bits to cross line L—L were they to gain transmission through the network. However, in the network of FIG. 3, which is typical of the situation where the number of bits in the data word is not an integer power of two, the set of paths which are never needed by data bits which have already crossed line L—L nor by data bits which will cross L—L at later stages of the network consists of so few paths that a subset of them can not be chosen and blocked unconditionally for left shift operations thereby forcing data bits to cross line L—L if they are to gain transmission to the output terminals of the network. In fact, in FIG. 3, there exist paths such as 13D–13E which may be required by bits which have crossed L—L or by bits which will later cross L—L.

A starting point in constructing the network for any system in which the number of data bits is not an integer power of two is to draw the line D—D just below the diagonal path from the extreme node at the upper left (i.e., just below the line from 19A to 8F in FIG. 3). All of the vertical paths crossing D—D are then made dotted. The set of nodes and paths to the lower left of the set of dotted paths includes all of the nodes and paths required by data bits which have already crossed line L—L. Thus blocking conditions imposed on the dotted paths can in no way affect any data bits which have crossed L—L. The technique for using the network of FIG. 3 to accomplish left shift operations will be explained in detail below but it is, in essence, to block the set of dotted vertical paths unless a data bit using a particular dotted path is being steered at subsequent stages of the network to cross line L—L.

There are 20 dotted vertical paths in FIG. 3, one for each column. It will be recalled that in FIG. 2 all of the vertical paths in the circuit network fall into three distinct groups, the dotted vertical paths, those at the upper right of the drawing, and those at the lower left. In FIG. 2 the vertical paths at the upper right are not controlled on left shifts because even if these paths are taken the bits at the respective nodes can subsequently cross L—L. (The basic rule for controlling a left shift is still the same: The input shift magnitude is complemented with respect to the number of bits in a data word and a right rotation is then controlled, with the only 1's in the original word which are allowed to be transmitted to the output nodes being those which cross L—L sometime during their transmission through the network.) In the 20-bit system of FIG. 3 the same remarks apply to the nodes and vertical paths at the upper right of the drawing. Even if the bits at these nodes take the respective vertical paths they may still cross L—L later on and for this reason the vertical paths at the upper right should not be blocked. In FIG. 2 all of the dotted vertical paths are unconditionally blocked. No blocking of the vertical paths at the lower left is desired because 1's at the nodes at the top of these paths must have already crossed L—L. But in FIG. 3 the dotted vertical paths are not all unconditionally blocked and it is possible for 1's in the original data word to be transmitted down these dotted paths under certain circumstances to the nodes at the lower left of the drawing. For these reasons consideration must also be given to the vertical paths at the lower left of the drawing, although as will be seen below the control used for the dotted vertical paths is such that no control is required for the vertical paths at the lower left of the drawing.

It must first be appreciated why all of the dotted vertical paths may not be unconditionally blocked. Consider path 12D–12E which crosses D—D. When the bits in the input word appear at the nodes in row D a step of 8 is about to be considered. The maximum possible shift taken in the first three steps is 7 (if X1, X2 and X4 are all 1's). The bit at node 12D can in no way have already crossed L—L. The bit at node 12D may have come only from one of the nodes 12A through 19A. Following the pattern set down in FIG. 2 path 12D–12E should be unconditionally blocked if X8 is a 0. In FIG. 2 the dotted vertical paths are blocked because, were they to be taken, the bits at the nodes at the tops of the paths could in no way subsequently cross L—L by the time they appear at the final row of nodes. But the bit at node 12D in FIG. 3 can cross L—L even if X8 is a 0. If X8 is a 0 the bit at node 12D is transmitted to node 12E. As long as X16 is a 1, the bit at node 12E will cross L—L and end up at node 16F. Consequently vertical path 12D–12E cannot be unconditionally blocked because the bit at node 12D may yet cross L—L even if vertical path 12D–12E is taken. It will be noted however that the bit at node 12D can cross L—L even if the vertical path is taken only if X16 is a 1. Consequently vertical paths 12D–12E should be blocked conditionally, i.e., a 0 should be automatically written at node 12E if X8 is a 0 unless X16 is a 1. If X16 is a vertical path 12D–12E need not be blocked because it is guaranteed that the bit at node 12D will subsequently cross L—L.

It is necessary to derive a suitable transmission function for each of the dotted vertical paths in FIG. 3. The transmission function for each path essentially states the following: On a left shift the path is to be blocked unless it is guaranteed that the bit at the node at the top of the path will subsequently cross L—L. The method now to be shown may be used for deriving the transmission functions of the vertical paths crossing the line D—D in other systems. Each transmission function is a Boolean expression. The total expression is a 1 if the respective vertical path is to be operative. It is a 0 if the respective vertical path is to be blocked and a 0 is to be automatically written at the node at which the path terminates. In the transmission functions to be derived the expression (HL) represents an input command to perform a left shift operation. HL is a 1 if a left shift is to be performed. It is a 0 if one of the other three possible operations is to be carried out.

The five nodes 4E through 0E are first considered. The input bits appear at these nodes when the step of 16 positions is about to be taken. Up to this point the maximum shift which may have taken place is 15

(8+4+2+1)

Bits at nodes 19E through 5E may have already crossed L—L. But the bits at nodes 4E through 0E may in no case have already crossed L—L, since node 4E is 16 positions to the right of line L—L and nodes 3E through 0E are even further away. If the diagonal step of 16 is not taken from these five nodes the bits at these nodes will not have crossed L—L by the time they appear at the nodes in row F. For this reason the vertical paths from nodes 4E through 0E must be unconditionally blocked on left shifts. The transmission function for the five vertical paths 4E–4F through 0E–0F is $(\overline{X16})(\overline{HL})$. (The term X16 represents the most significant bit in the steering word after it has been formed from the complement of the input shift magnitude. In other words, X16 is a 1 if the diagonal paths from nodes E are to be taken.) The transmission function $(\overline{X16})(\overline{HL})$ for the five vertical paths 4E–4F through 0E–0F depicts the operation of the paths in all cases. In the three cases other than left shifts HL is a 0 and thus $\overline{HL}$ is a 1 thus making the path transmission only a function of the steering term $\overline{X16}$. If X16 is a 0, $\overline{X16}$ is a 1 and the transmission function is a 1. The vertical paths may be used as required. If X16 is a 1, $\overline{X16}$ is a 0 and the vertical paths are blocked. Even though a left shift operation is not being performed the vertical paths may be blocked by the steering term because they are not required. (Although the blocking of a vertical path has been described above as controlling the automatic writing of a 0 at the node at the bottom of the path, a 0 is automatically written at the node only if a 1 does not come along the diagonal path terminating at the same node. Thus when X16 is a 1 although the five vertical paths may be blocked, 1's may appear at nodes 4F through 0F if 1's originally appear at nodes 0E and 16E through 19E.) If, on the other hand, HL is a 1 indicating that a left shift operation is being performed $\overline{HL}$ is a 0, and the five vertical paths are blocked no matter what the value of X16. This is the desired operation. If X16 is a 0 the vertical paths would normally transmit 1's but instead are blocked as required. The blocking of vertical paths 4E–4F through 0E–0F on left shifts is unconditional as seen from the transmission function $(\overline{LH})(\overline{X16})$.

Consider next nodes 12D through 5D in row D. When a step of 8 is about to be taken the maximum shift which can thus far have taken place is 7 (4+2+1). Bits which have already crossed L—L may appear at nodes 19D through 13D but the bits at node 12D and the bits at nodes to the right of 12D can in no way have already crossed L—L. If X8 is a 0 and the eight vertical paths 12D–12E through 5D–5E are taken it is still possible for the bits originally at nodes 12D through 5D to cross L—L. Even if these vertical paths are taken and the bits are transmitted to nodes 12E through 5E the eight bits may still cross L—L in the last stage if X16 is a 1. Consequently while the eight vertical paths should be blocked on left shifts if X8 is a 0, the blocking is conditional. The paths must not be blocked if X16 is a 1. If X16 is a 1 the eight vertical paths may be used even though the bits which are transmitted down them have not already crossed L—L because it is guaranteed that the bits will subsequently cross L—L in the last step.

The transmission function for the eight vertical paths 12D–12E through 5D–5E is $(\overline{X8})[(\overline{HL})+X16]$. On the three operations other than left shifts HL is a 0, $\overline{HL}$ is a 1 and thus the bracketed expression is also a 1. For these three operations there is no need to block the vertical paths other than as a function of the steering term, X8. If X8 is a 0, $\overline{X8}$ is a 1 and the transmission function is a 1; the paths are indeed not blocked. If X8 is a 1, $\overline{X8}$ is a 0, the transmission function is a 0 and transmission through the vertical paths is denied by the steering term. If a left shift operation is being performed, on the other hand, HL is a 1 and $\overline{HL}$ is a 0. In this case the transmission function reduces to $(\overline{X8})[X16]$. If X16 is a 0 the transmission function becomes a 0. This is the desired action; on left shifts the eight vertical paths 12D–12E through 5D–5E should be blocked if X16 is a 0. On the other hand, if X16 is a 1 the transmission function reduces to the steering term $\overline{X8}$. Thus the vertical paths are not blocked. This is the required action since these eight vertical paths are to be unblocked and allow vertical transmission if X16 is a 1 even on left shifts.

Consider next the bits at nodes 15C through 13C. (Node 16C which is also at the top of a dotted vertical path between rows C and D will be considered afterward.) When a step of 4 is about to be taken the bits at nodes 15C through 13C cannot possibly have already crossed L—L. The three vertical paths 15C–15D through 13C–13D should be blocked on left shifts unless it is guaranteed that the bits at nodes 15C through 13C will subsequently cross L—L. Regardless of the value of X8 the three bits which are transmitted down to nodes 15D through 13D can still cross L—L if X16 is a 1. If $X8=1$ a shift of 8 is taken between rows D and E but X16 must also be a 1 for these bits to cross L—L (X8 and X16 would actually never both be 1's because this would imply a steering word whose value is greater than 20). Consequently the three bits at nodes 15C through 13C are guaranteed to subsequently cross L—L even if the dotted vertical paths are taken if and only if X16 is a 1. Thus these three vretical paths must be conditionally blocked in the same manner as the eight vertical paths 12D–12F through 5D–5E. The transmission function for these three paths is identical to the transmission function previously considered except that the steering term $(\overline{X8})$ is replaced by the term $(\overline{X4})$. The transmission function for the three vertical paths 15C–15D through 13C–13D is thus $(\overline{X4})[\overline{HL}+X16]$.

It is also impossible for the bit at node 16C to have already crossed L—L when the step of 4 is about to be taken since the maximum shift thus far may be at most 3 (2+1). But path 16C–16D is in a different category than paths 15C–15D through 13C–13D. If the vertical paths 16C–16D is taken it is impossible for the bit at node 16C to subsequently cross L—L even if X16 is a 1. Since the input shift magnitude and the steering word which is the complement with respect to 20 of this magnitude must be 20 or less, X8 must be a 0 if X16 is a 1 and the bit at node 16C, if $X4=0$, can progress no further than to node OE. Consequently the bit at node 16C may in no case cross L—L if the vertical path 16C–16D is taken. Thus path 16C–16D must be unconditionally blocked. The transmission function for this path is $(\overline{X4})(\overline{HL})$. On all operations other than left shift, $(\overline{HL})$ is a 1. If steering function X4 is a 0, $(\overline{X4})$ is a 1, the transmission function is a 1 and vertical path 16C–16D may be taken as required. If X4 is a 1 the transmission function is a 0 as required for proper steering of bits through the network. If, on the other hand, HL is a 1 as it is for left shifts, $(\overline{HL})$ is a 0, the transmission function is a 0 and the vertical path is unconditionally blocked.

When a step of two positions is about to be taken the bits in the original word may have already been shifted a maximum of one position. Thus, the bits at nodes 18B and 17B in no way may have already crossed L—L. Suppose these bits take the respective vertical paths to nodes 18C and 17C. For the bit transmitted to node 17C to cross L—L it must yet be shifted 18 positions to the right. The bit at node 18C must yet be shifted 19 positions to the right. The only steps remaining are those of 4, 8 and 16 positions. Steps of 8 and 16 positions are both not allowed.

The only combination of steps guaranteeing that both bits cross L—L is 4 and 16. Consequently, paths 18B–18C and 17B–17C should be blocked on all left shifts unless X4 and X16 are both 1's. The transmission function for these two paths is $(\overline{X2})[\overline{HL}+(X16)(X4)]$. This transmission function describes the action of the two paths during all four types of operation. On the three operations other than left shift ($\overline{HL}$) is a 1. The vertical paths transmit data bits if X2 is a 0. This is the required action since the two paths should function in the normal manner whenever a vertical step is required between nodes 18B and 18C and nodes 17B and 17C on all operations other than left shift. If X2 is a 1 the two paths do not transmit data bits since the diagonal paths are taken rather than the vertical paths from nodes 18B and 17B. On left shifts $\overline{HL}$ is a 0. If X2 is a 0, $\overline{X2}$ is a 1 but the transmission function is a 1 only if both X4 and X16 are 1's. Thus, the vertical paths are blocked on all left shifts unless it is guaranteed that 1's transmitted down these paths will subsequently cross L—L.

The last dotted vertical path crossing D—D to be considered is 19A–19B. The transmission function for this path is the same as the one just derived for paths 18B–18C and 17B–17C. If a 1 at node 19A is transmitted vertically to node 19B it can cross L—L only if it is subsequently shifted 20 positions to the right. Consequently, the path is blocked on all left shifts unless both X4 and X16 are 1's. It should be noted that if X4 and X16 are both 1's and the operation being performed is a left shift, the original uncomplemented shift magnitude must have been zero. Path 19A–19B will thus be blocked on all left shifts unless the input data word is not to be shifted at all. This is the required action because if the data word is shifted at all to the left, the bit at node 19A, the leftmost bit in the original data word, must be erased from the system.

The 20 transmission functions just derived for the 20 dotted vertical paths define the action of these paths on all four types of operation. The vertical paths to the upper right of these paths need not be controlled other than by the steering functions because the bits at the nodes at the tops of these paths may subsequently cross L—L even if they take vertical steps. Thus no special control is required of these vertical paths when a left shift is being performed. No special control is ever required for a vertical path when one of the other three types of operation is being performed. Consequently, the transmission function for each of these paths is merely of the form $(\overline{Xi})$. Each of these paths transmits a bit down through it only if its controlling bit in the steering word is a 0. If the controlling bit is a 1 and the diagonal paths are to be taken, the transmission functions for the verticalm paths are 0's.

The last group of vertical paths to be considered are those at the lower left of the drawing. In FIG. 2 the transmission functions for these paths are merely of the form $(\overline{Xi})$. Even on left shifts transmission should be granted if X*i* is a 0 because any 1's which appear at the nodes at the tops of these paths must have already crossed L—L. The same is not true, however, of the vertical paths at the lower left of FIG. 3. Because some of the dotted vertical paths may not be blocked on left shifts 1's may be transmitted down these paths to the nodes at the lower left of the drawing even if they have not yet crossed L—L. But it is to be recalled that 1's are so transmitted down the vertical paths only if it is guaranteed that they will subsequently cross L—L. Consequently, it is not necessary to provide additional blocking for any of the vertical paths at the lower left of the drawing. The transmission functions for these paths is again of the form $(\overline{Xi})$.

The transmission functions for the diagonal paths must yet be derived. Almost all of the diagonal paths have transmission functions of the form (X*i*). The diagonal paths are taken whenever the respective controlling bits in the shift magnitude word are 1's. The diagonal paths whose transmission functions are not of the simple form (X*i*) are those which cross L—L. It will be recalled that on right shifts these paths must be blocked. The transmission functions for the diagonal paths crossing L—L are thus of the form $(Xi)(\overline{HR})$. HR is a 1 only when the operation performed is a right shift. When a right shift operation is performed the diagonal paths crossing L—L are blocked since their transmission functions are 0's. When one of the other three types of operation is being performed HR is a 0 and the transmission functions of the diagonal paths crossing L—L are reduced to the form (X*i*) since these diagonal paths are controlled in the same manner as are the other diagonal paths in the network.

The analysis of FIG. 3 has been given in order that the method of derivation of the transmission functions for all types of paths be understood even when they must be derived for a system in which the number of bits in a data word is not a power of two. While the transmission functions of all paths may thus be derived the actual implementation of the network may not be trivial. The design of a particular shift and rotate circuit may also depend on characteristics of the particular type of transmission paths and gates used at each stage. In FIGS. 4–7 a 20-bit system based on the network of FIG. 3 is shown where the transmission paths are controlled by relay contacts. FIGS. 4–7 are being included in order that the basic design approach be understood. Most data processing systems requiring a shift and rotate circuit utilize electric circuitry. Due to the nature of electronic gates the design of an electronic circuit may have to be modified slightly. The modifications required will be appreciated after the simpler relay circuit is first considered.

*Twenty-bit relay shift and rotate circuit* (*FIGS. 4–7*)

Figure 4:
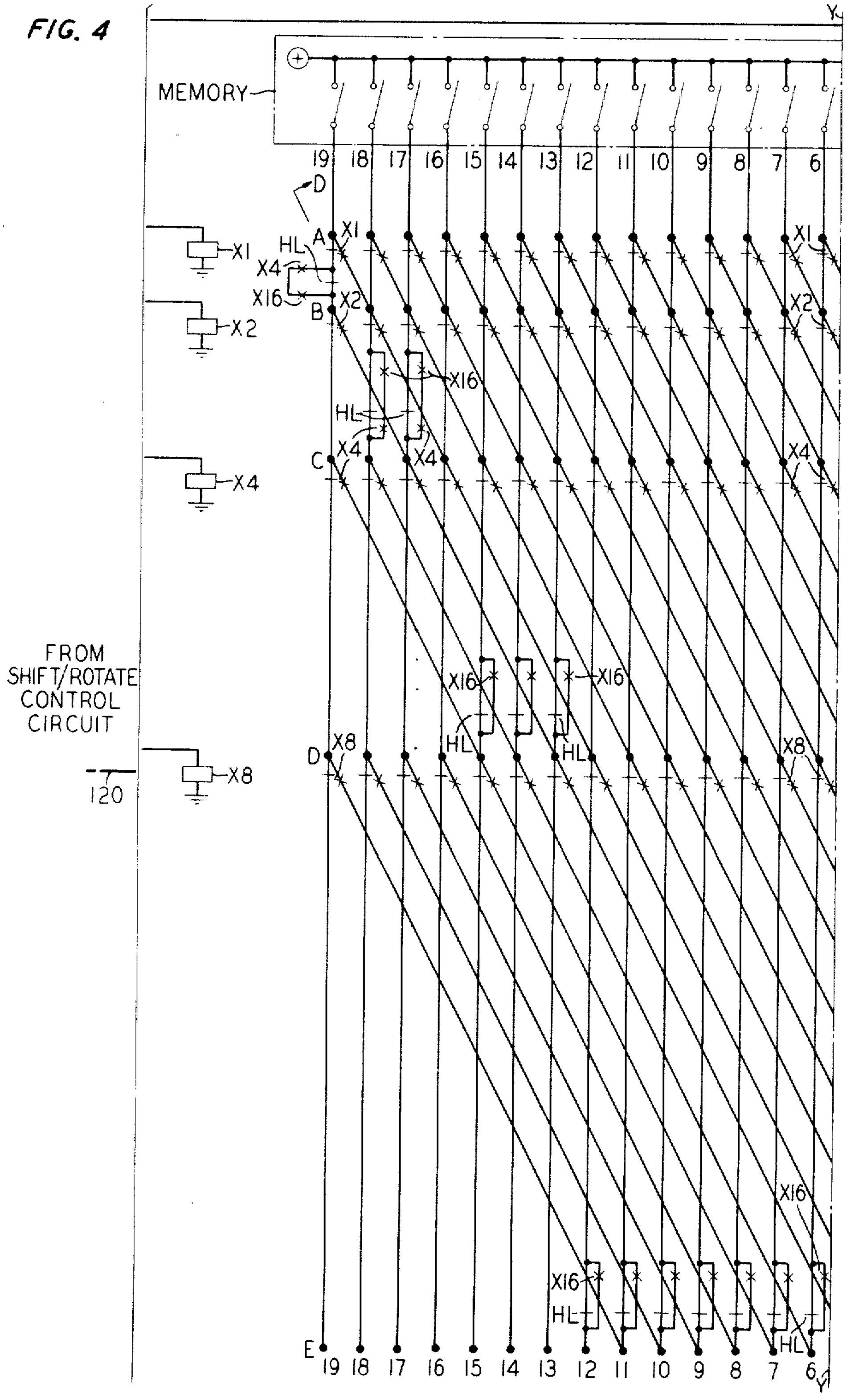
FIGS. 4–7 depict a shift and rotate combinational logic circuit for a 20-bit data word system in which the shifting and rotating operations are controlled by relay contacts.
Figure 5:
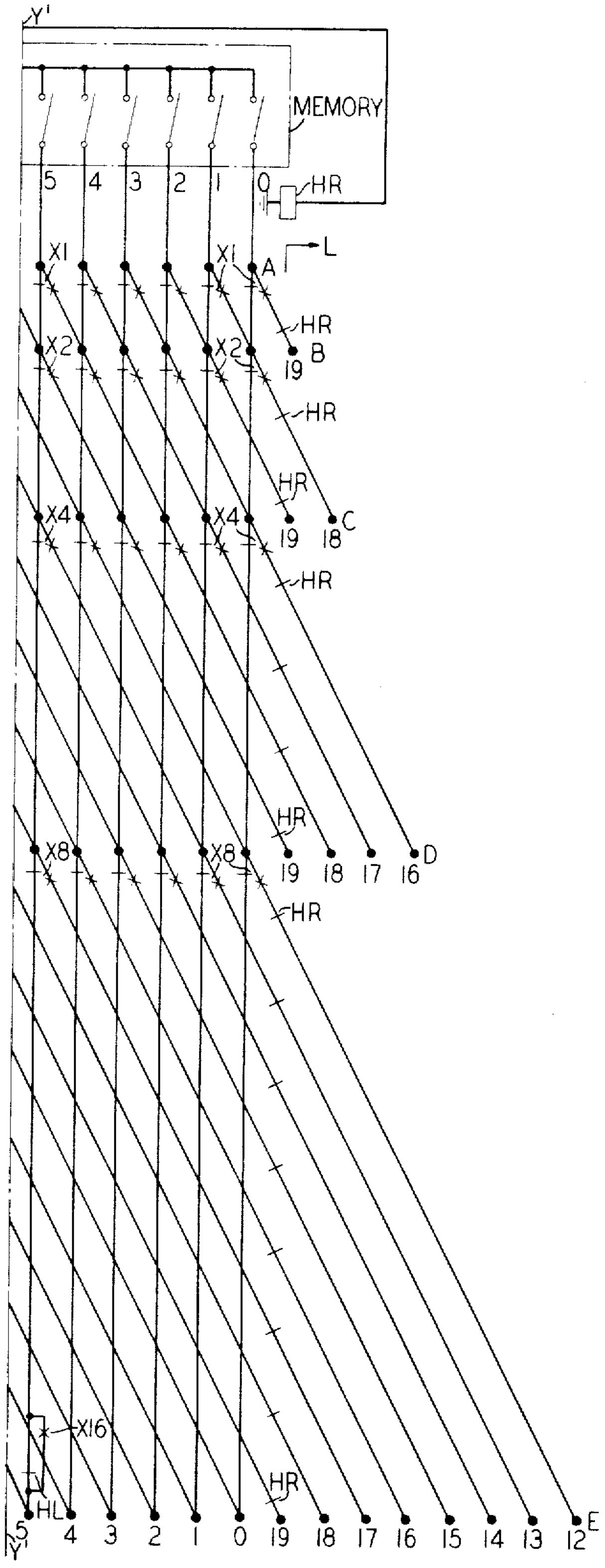
Figure 6:
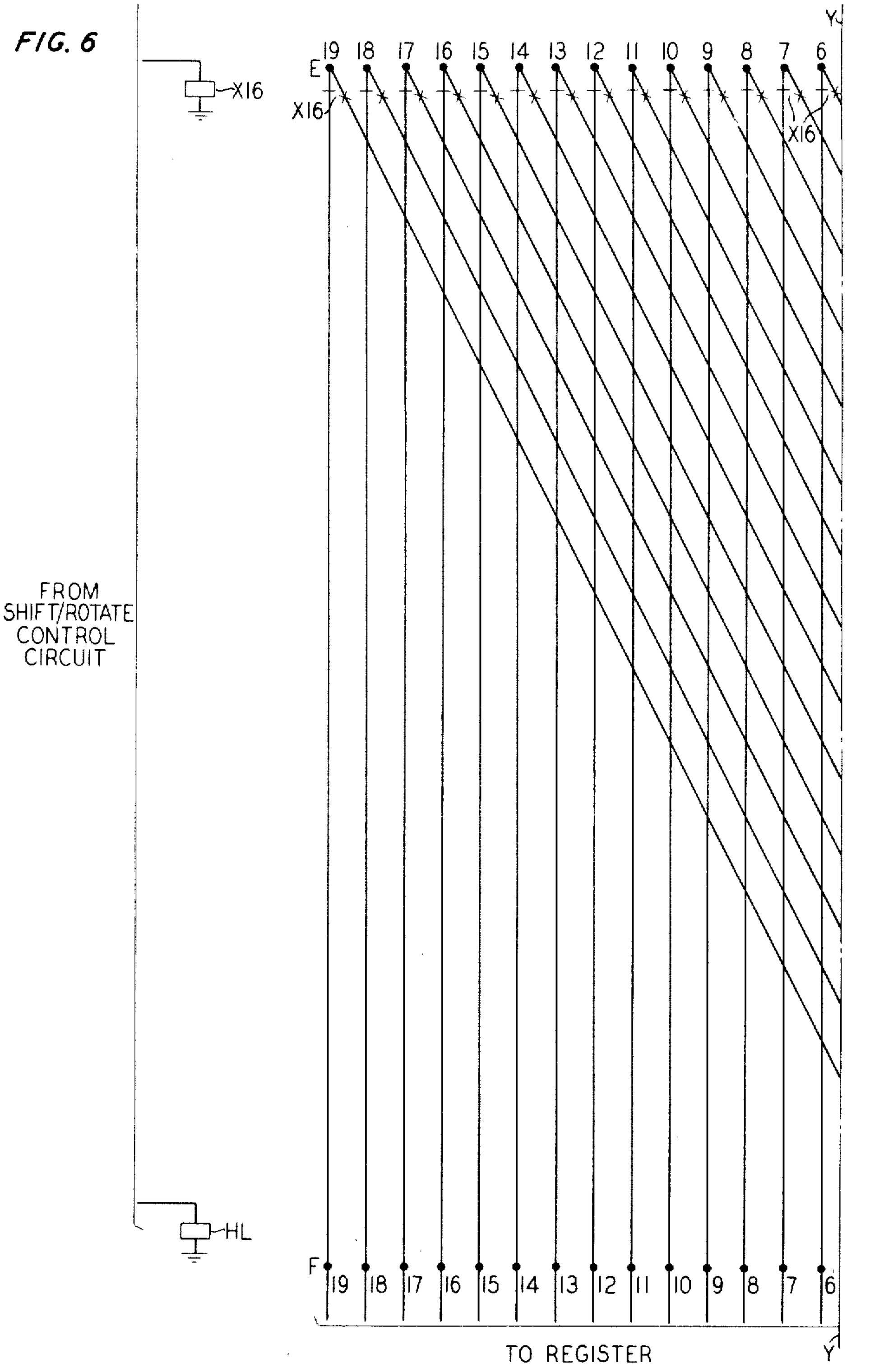
Figure 7:
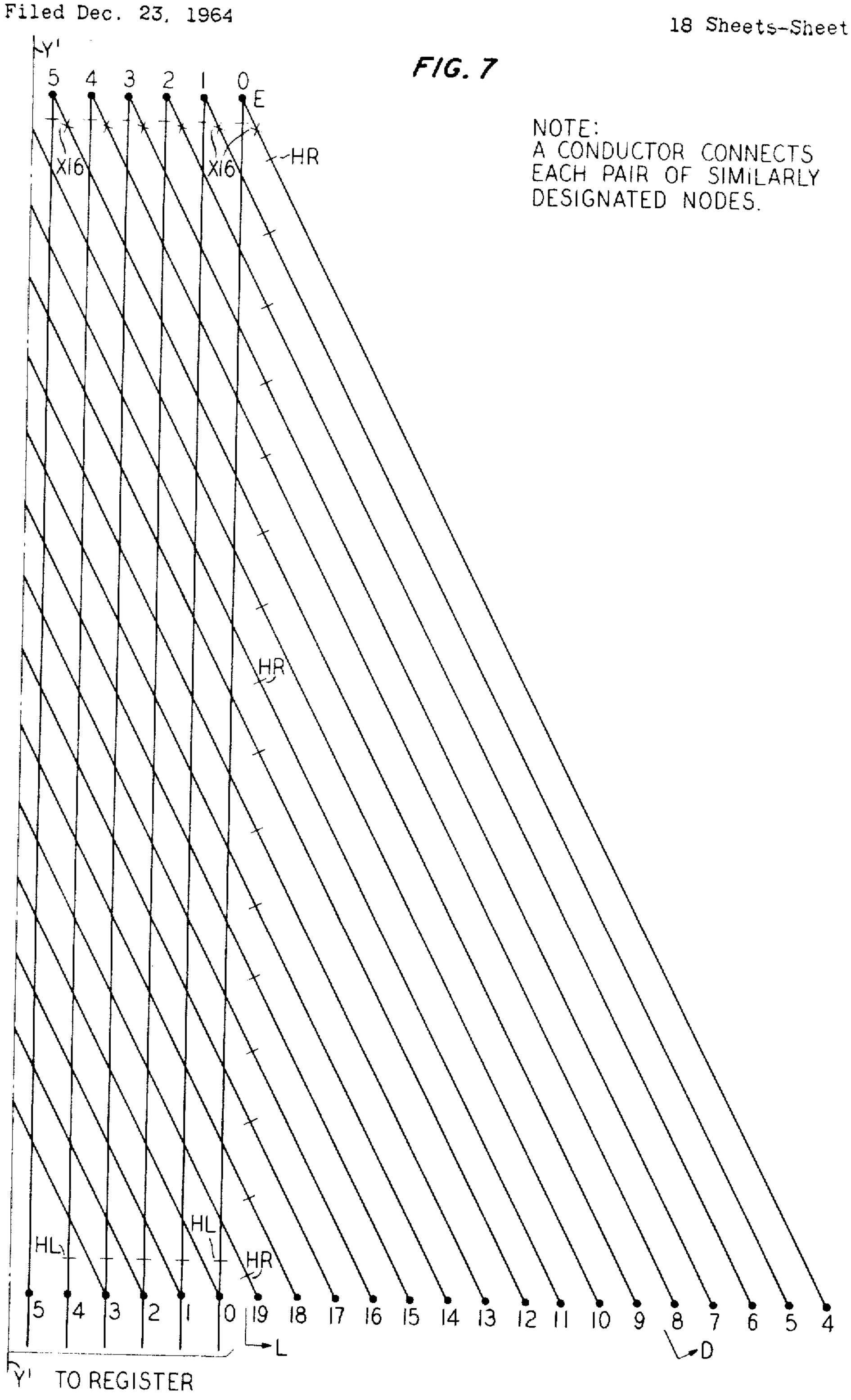

FIGS. 4–7 are aligned as follows: The vertical line Y on FIGS. 4 and 6 is superimposed on the vertical line Y' on FIGS. 5 and 7. Lines Y and Y' are included only for orienting the drawing and are not representative of a conductor or transmission path. These lines may be ignored after FIGS. 4–7 are properly grouped.

In the system of FIGS. 4–7, the figures being arranged as shown in FIG. 19, 1's are represented by a positive potential and 0's are represented by the absence of a potential. The input bits appear at nodes 19A–0A. In the drawing a series of manual switches is shown, each controlling the application of a positive potential to a respective one of the nodes in row A. If a particular switch is closed the positive potential at the respective node in row A represents a 1. If the switch is open the absence of the positive potential at the respective node represents a 0. It will be recalled that in FIG. 1 the bits in the input data word are transmitted to the shift and rotate circuit from memory 101 or form one of the registers. The switches in FIGS. 4–7 are shown in a memory merely for the sake of simplicity. It is to be understood however that the input bits at the nodes in row A are derived in a practical system not by the operation of manual switches but from some other unit in the data processor.

In FIG. 1 the commands transmitted over cable 120 to the shift and rotate circuit include a shift magnitude, a shift direction and the type of operation to be performed. If a left shift or left rotate operation is to be performed the shift and rotate circuit first complements the shift magnitude with respect to 20 and then applies the steering word to the circuit. It is assumed in FIGS. 4–7 for the sake of simplicity that the shift magnitude has already been complemented in the shift/rotate control circuit. Relays X16–X1 operate in accordance with respective bits X16–X1 in the steering word, these bits being the same as the original shift magnitude bits if shifting is to the right and being already complemented with respect to 20 if the shifting is to the left. If one of steering relays X16–X1 is operated the respective step taken in the network is along the respective diagonal path. If the relay is unoperated the step taken is along the respective vertical path. The shift/rotate control circuit controls the operation of relay HL whenever a left shift operation is to be performed. The shift/rotate circuit controls the operation of relay HR whenever a right shift operation is to be performed. If neither relay is operated the operation performed is a right rotation, the right rotation accomplishing the required left rotation, if a left rotation has been ordered, because the shift magnitude bits have already been complemented with respect to the number 20.

It must be borne in mind that, as in FIG. 3, similarly designated nodes in any row are connected to each other, the nodes being shown twice in order not to complicate the drawing.

Consider the simplest case in which a right rotation is being performed (to carry out either a right rotation command or a left rotation command). Neither of relays HL and HR is operated. Contacts on relay HL are included in none of the diagonal paths. Contacts on relay HR are included in all diagonal paths crossing L—L, but since relay HR is unoperated all of its contacts in the diagonal paths are closed. Consequently, transmission along every diagonal path in the network is controlled solely by the operation of a respective one of the steering relays X16–X1. If the respective relay is unoperated ($Xi$ being a 0) no transmission along the diagonal conductors takes place. If the relay is operated ($Xi$ being a 1) bits are transmitted along the diagonals.

All of the vertical paths similarly include contacts on respective ones of relays X16–X1. Transmission along the vertical paths may take place whenever transmission along a diagonal path is denied. In addition, the 20 vertical paths crossing D—D each includes a contact on relay HL. Since relay HL is not operated when the operation performed is a right rotation all of the vertical paths are similarly controlled only by the operations of respective ones of the steering relays X16–X1.

Suppose X1 is a 0 and relay X1 is unoperated. The potentials at the nodes in row A are transmitted vertically to respective nodes in row B. Each node in row B thus is at a positive potential if the respective bit in the input word is a 1 and is not at a positive potential if the respective bit in the input word is a 0. It should be noted that the potential at each of the nodes in row B is in no way controlled by the potential of the node in row A in the next left-most column because all of the diagonal paths from the nodes in row A are blocked since relay X1 is unoperated.

On the other hand suppose X1 is a 1 and relay X1 is operated. All of the vertical paths from the nodes in row A are blocked because the normally closed contacts on relay X1 are now open. Because the normally open contacts on relay X1 are now closed a path is completed from each of the nodes in row A to the adjacent node to the right in row B. Thus a positive potential at node 9A appears at node 8B. On the other hand, if bit 9A was originally a 0 there is no positive potential transmitted to node 8B. It should be noted that the potential of node 0A appears at node 19B since the normally closed contacts on relay HL contained in the diagonal path connecting nodes 0A and 19B are closed.

Similar remarks apply to the transmission of bits from the nodes in row B to the nodes in row C depending on the operation of relay X2. If the diagonal paths are taken each bit value is shifted two positions to the right. The process continues and the bits are transmitted through the network until finally they are transmitted along the vertical or diagonal paths connecting the nodes in row E to the nodes in row F. Some of the nodes 19F through 0F are at a positive potential, and the others are not. The bit values represented by the two respective conditions are 1 and 0. Effectively the input data word has been rotated to the right the required number of positions as it is transmitted through the shift and rotate circuit. At no time during the rotation operation is a register required. The data word may be rotated as it is transmitted from one part of the data processor to another. The 20 nodes 19F through 0F are connected by respective conductors to complement circuit 102 in FIG. 1.

When the input data word is to be shifted to the right rather than rotated relay HR is operated. All of the diagonal paths crossing L—L are thus blocked (open circuited) even if the respective ones of the steering relays X16–X1 are operated. The only difference in the operation of the system is that if the steering relays attempt to direct a data bit along a diagonal path crossing L—L the positive potential at the node at the top of the path is not transmitted to the node at the bottom of the path. Even if the initial bit is a 1 the bit which appears at the node in the next row is a 0 since the positive potential does not appear at the node. For example, suppose node 2D is at a positive potential and relay X8 is operated. In the case of a right rotation the positive potential at node 2D would be transmitted along conductor 2D–14E to node 14E. But if relay HR is operated the path is open circuited, and no potential is transmitted from node 2D to node 14E. (And, of course, no potential is transmitted from node 14D to node 14E because the vertical path is open due to the operation of relay X8.) Consequently a positive potential does not appear at node 14E and the bit which is effectively represented at this node is a 0. In this manner 1's shifted to the right across line L—L do not reenter the left end of the system.

The remaining case to be considered is that of the left shift. Relay HR is not operated and the diagonal paths are controlled as required solely by the operation of respective ones of the steering relays X16–X1. It will be recalled however that the vertical paths crossing D—D must be controlled in accordance with the transmission functions derived above. These paths must be conditionally blocked on all left shifts but unblocked if it is guaranteed that bits transmitted down them will subsequently cross L—L. The transmission functions for the 20 vertical paths crossing D—D are repeated at this point for easy reference:

| Path (from node to node): | Transmission function |
|---|---|
| **19A–19B** | $(\overline{X1})[(\overline{HL})+(X16)(X4)]$ |
| **18B–18C** | $(\overline{X2})[(\overline{HL})+(X16)(X4)]$ |
| **17B–17C** | $(\overline{X2})[(\overline{HL})+(X16)(X4)]$ |
| **16C–16D** | $(\overline{X4})(\overline{HL})$ |
| **15C–15D** | $(\overline{X4})[(\overline{HL})+X16]$ |
| **14C–14D** | $(\overline{X4})[(\overline{HL})+X16]$ |
| **13C–13D** | $(\overline{X4})[(\overline{HL})+X16]$ |
| **12D–12E** | $(\overline{X8})[(\overline{HL})+X16]$ |
| **11D–11E** | $(\overline{X8})[(\overline{HL})+X16]$ |
| **10D–10E** | $(\overline{X8})[(\overline{HL})+X16]$ |
| **9D–9E** | $(\overline{X8})[(\overline{HL})+X16]$ |
| **8D–8E** | $(\overline{X8})[(\overline{HL})+X16]$ |
| **7D–7E** | $(\overline{X8})[(\overline{HL})+X16]$ |
| **6D–6E** | $(\overline{X8})[(\overline{HL})+X16]$ |
| **5D–5E** | $(\overline{X8})[(\overline{HL})+X16]$ |
| **4E–4F** | $(\overline{X16})(\overline{HL})$ |
| **3E–3F** | $(\overline{X16})(\overline{HL})$ |
| **2E–2F** | $(\overline{X16})(\overline{HL})$ |
| **1E–1F** | $(\overline{X16})(\overline{HL})$ |
| **0E–0F** | $(\overline{X16})(\overline{HL})$ |

Consider for example the transmission function for path 7D–7E which is $(\overline{X8})[(\overline{HL})+X16]$. This function is a 1 whenever a path is to be completed betwen nodes 7D and 7E. The $(\overline{X8})$ term is controlled by the normally closed contacts on the steering relay X8 at the top of the path. Only if relay X8 is unoperated can the path be completed. The HL contacts in the path conditionally block it. These contacts are open when a left shift operation is being performed. However the vertical path is to be completed even on left shifts if bit X16 is a 1. It will be noted that contacts on relay X16 are in parallel with contacts on relay HL. If relay X16 is operated, i.e., bit X16 is a 1, the transmission function is a 1 and the path between nodes 7D and 7E is completed.

As another example consider the path connecting nodes 18B and 18C. The transmission function for this path is $(\overline{X2})[(\overline{HL})+(X16)(X4)]$. The $(\overline{X2})$ term is contributed by the normally closed contacts on relay X2 at the top of the path. The path is conditionally blocked on left shifts because the contacts on relay HL in the path are open. The path is completed however if both of relays X4 and X16 are operated.

Of the 20 vertical paths crossing D—D all are conditionally blocked on left shifts except the path connecting nodes 16B and 16C and the paths connecting nodes 4E through 0E to respective nodes 4F through 0F. As derived above these paths must be unconditionally blocked on all left shifts. It will be noted that there are no contacts on relays X16–X1 which are in parallel with the contacts on relay HL contained in these six paths. These paths are absolutely blocked on all left shifts.

The relay circuit implementation is straight-forward once the transmission functions for the various paths are derived. It will be observed that the relay network in FIGS. 4–7 is actually the same as the network shown in FIG. 3 except for the addition of the relay contacts, with each line in FIGS. 4–7 representing a conductor rather than a transmission path as in FIG. 3. In a practical data processing system electronic components are likely to be used due to their inherent greater speed. The design of an electronic circuit however may be considerably more complicated. This is due to the fact that many transistor gates invert a signal transmitted through them. Thus transmission along a vertical or a diagonal might result in a 0 becoming a 1 or a 1 becoming a 0 if no consideration is given to the particularities of transistor gates when the circuit is implemented. The electronic 20-bit shift and rotate circuit of FIGS. 9–16 is also based on the network of FIG. 3 and the transmission functions previously derived. However as will be explained below the transmission functions must be modified slightly for proper operation.

*20-bit electronic shift and rotate circuit (FIGS. 8–16)*

The gates in the electronic shift and rotate circuit are shown only in block diagram form. Before proceeding to an analysis of the shift and rotate circuit it is necessary to consider the particular gate circuit used. The basic gate circuit is shown in FIG. 8A, FIG. 8B showing the symbolic notation for the gate used throughout the detailed drawing. FIG. 8C is a table indicating the output of a three-input gate for the eight combinations of input signal levels.

The operation of the gate may be succinctly described as follows: The output is low (0) only if all inputs are high (1). Conversely, the output is high if at least one input is low. Throughout the illustrative embodiment of the invention, low level (ground) signals represent 0's, and high level signals represent 1's. Referring to FIG. 8A, if all inputs are high all of the input diodes are reverse biased. Consequently, current flows from source 800 through 801, diode 803 and the base-emitter junction of transistor 8Q1. The transistor conducts and the output is short-circuited through the transistor to ground. Thus, if all inputs are high, the output is low. However, if at least one input is low, current from source 800 flows through the respective input diode to the low level input source. Current does not flow through diode 803, and transistor 8Q1 remains nonconducting. The collector of this transistor, the output of the gate, is thus high, equal in magnitude to the potential of source 802. All that is required is for one of the inputs to be low for the output to be high.

FIG. 8C illustrates the operation of the gate when three inputs are provided. The output of the gate is a 1 if at least one of the inputs is a 0. The output is low only if all inputs are high. If a particular gate has only one input it functions as an inverter. If the input is low the output is high, and if the input is high the output is low.

The particular gate employed in the illustrative embodiment of the invention is advantageous for the following reason. The outputs of two gates may be tied together and the combined output will be low if either of the individual outputs is low. Referring to FIG. 8A it will be noted that even though transistor 8Q1 may not conduct, the output may still be low if the output terminal is shorted to ground through the transistor in some other gate whose output terminal is connected to ground through the respective transistor. It will be recalled that each node terminates two paths, a vertical path from a node directly above and a diagonal path from a node to the left in the next highest row. Only one of these paths is to function during any step because either all of the diagonal paths or all of the vertical paths connecting the nodes of one row to the nodes of another row operate. By controlling the transistor in the unoperated path to remain off the potential at the node terminating the path will be controlled solely by the operation of the gate in the other path terminating at the node. If the transistor in this other gate does not conduct the potential of the node will be high. If the transistor does conduct however the potential of the node will be low. Consequently the potential at each node may be controlled in accordance with the potential at only one of the nodes in the row above to which it is connected. The unoperated (or blocked) path always supplies a high potential for the node. It is the other, operated, path which actually controls the potential of the node depending on whether or not the transistor in this path conducts.

Figure 9:
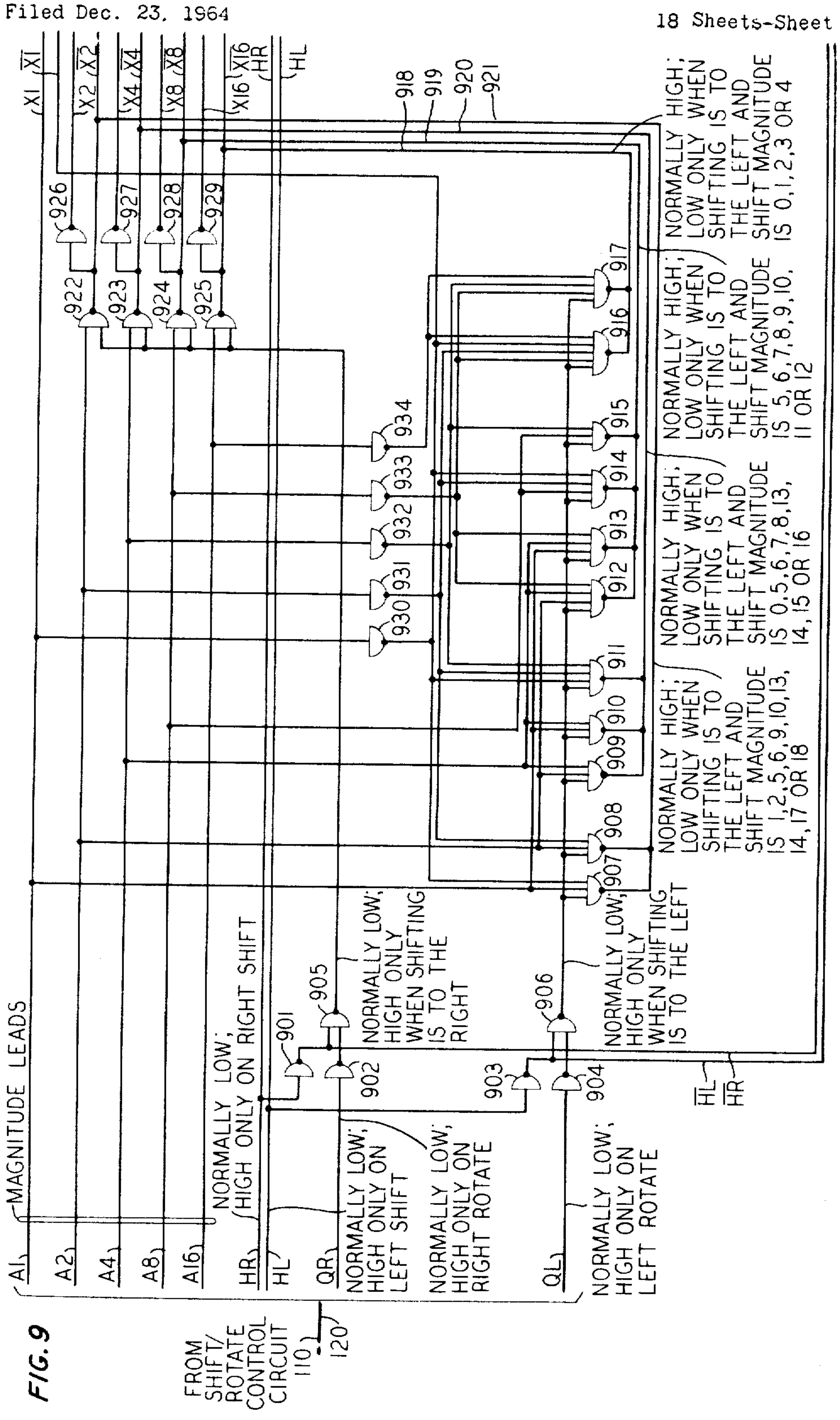
FIGS. 9–16 depict a shift and rotate combinational logic circuit for a 20-bit data word system in which the shifting and rotating operations are controlled by a series of electronic gates.

The detailed electronic 20-bit shift and rotate circuit, based on the network of FIG. 3, is shown in FIGS. 9–16, the arrangement of the figures being shown in FIG. 20. There are nine control signals transmitted along cable 120 from the shift/rotate control circuit 110 to FIG. 9. Five of the leads, A16, A8, A4, A2 and A1 carry the magnitude of the shift required. The five bits transmitted over these leads represent in binary code the magnitude of the desired shift. This magnitude is the uncomplemented value and is the actual magnitude of the shift to be executed. The five magnitude leads and the four control leads HR, HL, QR and QL are normally low. Only one of the latter four control leads goes high to indicate the type of operation to be performed and the direction of the operation. HR goes high for a right shift, HL goes high for a left shift, QR goes high for a right rotate and QL goes high for a left rotate operation. The primary purpose of the circuitry in FIG. 9 is to derive the steering word which actually controls the shifting of the data bits through the network of FIGS. 11–16. The steering bits which control the shifting appear on conductors X16, X8, X4, X2 and X1. Leads $\overline{X16}$, $\overline{X8}$, $\overline{X4}$, $\overline{X2}$ and $\overline{X1}$ carry the complements of the bits in the respective steering leads, the complemented bit values also being required to control the shifting. The five leads X16, X8, X4, X2 and X1 are at potentials identical to those on respective leads A16, A8, A4, A2 and A1 if the direction of the shift is to the right. However if a left shift or a left rotation operation is to be performed the steering word on leads X16–X1 is the complement of the shift magnitude on leads A16–

A1, with respect to the decimal number 20. FIG. 9 includes the circuitry for complementing the input shift magnitude with respect to 20 if the direction of the shift is to the left.

Gates 901, 902, 903 and 904 serve as inverters since each of them has only one input. Since only one of conductors HR, HL, QR and QL is high the output of only one of the four gates is low. Before any order is transmitted from the shift/rotate control circuit all four of leads HR, HL, QR and QL are low. All four outputs of gates 901–904 are high. Since both inputs of gate 905 and both inputs of gate 906 are normally high, the outputs of both gates 905 and 906 are normally low. When a left shift or rotate operation is to be performed one of the inputs of gate 906 goes low and consequently the output goes high. Similarly when a right shift or a right rotate operation is to be performed one of the inputs of gate 905 goes low and the output goes high. The outputs of gates 905 and 906 are thus dependent only on the direction of the shift, not the particular operation to be performed. The outputs of these two gates control the complementing of the input shift magnitude. No differentation is made between shift and rotate operations because the complementing of the input shift magnitude is a function only of the shift direction, not the particular type of operation to be performed.

If the direction of the shift is to the right the output of gate 906 is low. Since the output of gate 906 is an input to each of gates 907–917 the outputs of these gates are all high. The outputs of various ones of these gates are tied together but since all of the outputs are high all of conductors 918–921 are high. These conductors are tied to the outputs of respective ones of gates 922–925 and since the four conductors 918–921 are all high the potentials applied to leads $\overline{X16}$, $\overline{X8}$, $\overline{X4}$ and $\overline{X2}$ are a function only of the operations of respective ones of gates 922–925.

One of the inputs of each of these four gates is connected to the output of gate 905 which is high on a right shift. The other input of each of these gates is connected to a respective one of leads A16, A8, A4 and A2. Consequently the output of each of these gates is the complement of the respective shift magnitude bit. Thus for example the potential on lead $\overline{X16}$ is the inverse of the potential on lead A16. Inverter 929 inverts the bit value on conductor $\overline{X16}$ and the output of this gate, X16, is the same as the value of bit A16. Similar remarks apply to gates 926, 927 and 928. Consequently on right shifts bits X16, X8, X4 and X2 are the same as the bits on leads A16, A8, A4 and A2. Lead X1 is connected directly to A1 and thus bit X1 is the same value as the least significant bit in the input magnitude word. Gate 930 inverts the value of the bit on lead A1 and, since the output of gate 930 is connected directly to conductor $\overline{X1}$, bit $\overline{X1}$ is the complement of bit X1. Thus when the direction of the shift is to the right the steering word (X16)(X8)(X4)(X2)(X1) is identical to the input shift magnitude from the shift/rotate control circuit as required. Bits $\overline{X16}$, $\overline{X8}$, $\overline{X4}$, $\overline{X2}$ and $\overline{X1}$ are merely the complements of respective bits in the final shift magnitude word, the complemented bits also being required for control purposes.

Gates 907–917 and gates 930–934 serve to complement the input shift magnitude on leads A16–A1 with respect to the number 20 whenever the direction of the shift is to the left. The operation of these gates may be best understood upon analysis of the following table. The table gives the binary form for each of the decimal numbers 0–20. The complement of each of the numbers with respect to 20 is also given. At the right side of the table five columns are shown, one column for each of bits X16, X8, X4, X2 and X1. A check in any column indicates that the respective bit is to be a 1 in order that the final steering word be the complement with respect to 20 of the input shift magnitude word.

| Decimal Number | Binary Form | Decimal Number Complemented With Respect to 20 | Binary Form | Bits in Complemented Binary Number Which Are 1's | | | | |
|---|---|---|---|---|---|---|---|---|
| | | | | X16 | X8 | X4 | X2 | X1 |
| 0 | 00000 | 20 | 10100 | √ | | √ | | |
| 1 | 00001 | 19 | 10011 | √ | | | √ | √ |
| 2 | 00010 | 18 | 10010 | √ | | | √ | |
| 3 | 00011 | 17 | 10001 | √ | | | | √ |
| 4 | 00100 | 16 | 10000 | √ | | | | |
| 5 | 00101 | 15 | 01111 | | √ | √ | √ | √ |
| 6 | 00110 | 14 | 01110 | | √ | √ | √ | |
| 7 | 00111 | 13 | 01101 | | √ | √ | | √ |
| 8 | 01000 | 12 | 01100 | | √ | √ | | |
| 9 | 01001 | 11 | 01011 | | √ | | √ | √ |
| 10 | 01010 | 10 | 01010 | | √ | | √ | |
| 11 | 01011 | 9 | 01001 | | √ | | | √ |
| 12 | 01100 | 8 | 01000 | | √ | | | |
| 13 | 01101 | 7 | 00111 | | | √ | √ | √ |
| 14 | 01110 | 6 | 00110 | | | √ | √ | |
| 15 | 01111 | 5 | 00101 | | | √ | | √ |
| 16 | 10000 | 4 | 00100 | | | √ | | |
| 17 | 10001 | 3 | 00011 | | | | √ | √ |
| 18 | 10010 | 2 | 00010 | | | | √ | |
| 19 | 10011 | 1 | 00001 | | | | | √ |
| 20 | 10100 | 0 | 00000 | | | | | |

The first thing to note in the table is that bit X1 is always the same as bit A1 even when the input shift magnitude is complemented with respect to 20. For this reason conductor X1 in FIG. 9 is connected directly to conductor A1. Conductor $\overline{X1}$ always contains the complement of bit X1 due to the inverting action of gate 930. The other four bits X16, X8, X4 and X2 are controlled in accordance with the operation of gates 907–917 and 930–934. The principles behind the design of the circuit are the following. The outputs of all of gates 922–925 are high because one of the inputs of each of these gates is connected to the output of gate 905 which is low when the direction of shift is to the left. Consequently the value of each of bits $\overline{X16}$, $\overline{X8}$, $\overline{X4}$ and $\overline{X2}$ is controlled by the potential of the respective one of conductors 918–921. Each of these conductors must go low when the respective complemented bit in the steering word is to be a 0, i.e., each of these conductors must go low when the respective one of bits X16, X8, X4 and X2 in the final magnitude word is to be a 1.

Consider first conductor 918 which controls the value of bit X16. As seen from the table this conductor must go low to control bit X16 to be a 1 when the input shift magnitude is 0, 1, 2, 3 or 4. The input shift magnitude is one of these values when A16, A8 and A4 are all 0's, or when A16, A8, A2 and A1 are all 0's. Three of the inputs of gate 917 are connected to the outputs of gates 934, 933 and 932. If bits A16, A8 and A4 are all 0's the outputs of these three gates are high and thus three of the inputs of gate 917 are high. When shifting is to the left the fourth input of gate 917, connected to the output of gate 906, is also high. Since all four inputs of gate 917 are high its output is low and conductor 918 is low as required. The other situation in which conductor 918 is to go low, when all of bits A16, A8, A2 and A1 are 0's, is controlled by gate 916. The input of this gate connected to the output of gate 906 is high when shifting is to the left. The other four inputs are connected to the outputs of gates 934, 933, 931 and 930 which are high when bits A16, A8, A2 and A1 are 0's. Consequently the output of gate 916 is low when bits A16, A8, A2 and A1 are all 0's to control bit X16 to be a 1.

Gates 912–915 control the potential of conductor 919 and the value of bit X8. The operations of these gates may be analyzed for each of the 20 possible input shift magnitudes. The outputs of all these gates are high unless the direction of shift is to the left and the input shift magnitude is one of the numbers 5–12. As seen from the table bit X8 is to be a 1, i.e., conductor 919 is to go low, only when the input shift magnitude is one of the numbers 5–12. At least one of the outputs of gates 912–915 goes low when shifting is to the left and the input shift magnitude is one of the values 5–12. In a similar manner gates 909–911 control the value of bit X4 and gates 907 and 908 control the value of bit X2. The primary function of the circuitry in FIG. 9 is to derive the steering word (X16)(X8)(X4)(X2)(X1) which controls the paths taken by the data word in the network. The direction of the shift through the network is always to the right. If the input command to the system is to shift or rotate to the left the steering word which controls the actual shifting to the right is constructed to be the complement of the input shift magnitude with respect to 20.

In addition to the ten leads $\overline{X16}$–X1 which are extended from FIG. 9 to the remainder of the shift and rtoate circuit, four leads HL, HR, $\overline{HL}$ and $\overline{HR}$ are extended from FIG. 9 to the remaining figures. These four leads indicate whether either of the shift operations is to be performed. The circuitry in the remainder of the system requires no additional information. If the four leads HL, HR, $\overline{HL}$ and $\overline{HR}$ do not specify a shift operation, the input data word is rotated to the right. No further control for accomplishing a left rotate operation is required since the input shift magnitude is already complemented and automatically controls the left rotate operation even through the input data word is actually rotated to the right.

Figure 10:
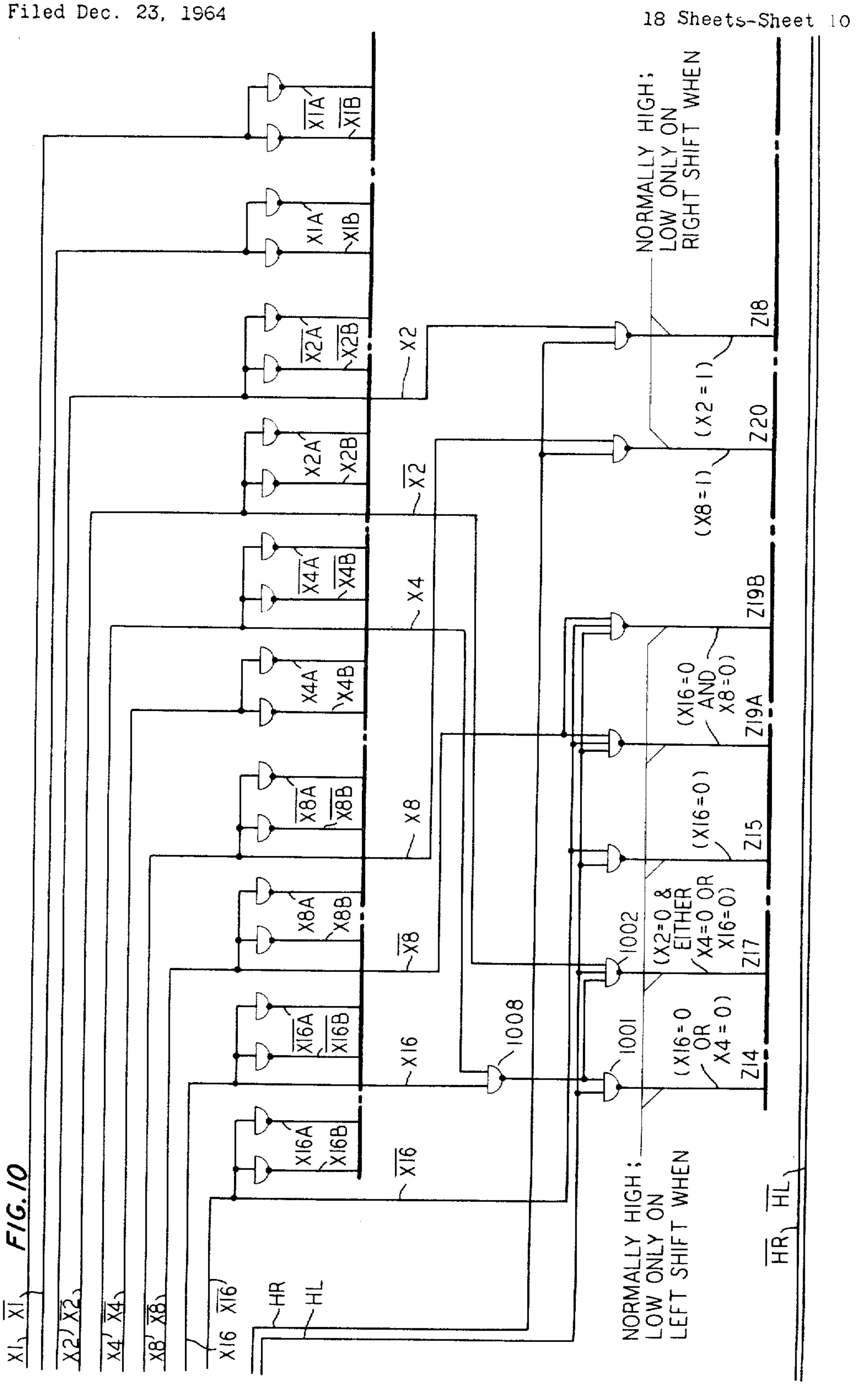

The purpose of the circuitry on FIG. 10 is to derive certain control signals which are required in FIGS. 11–16. The ten conductors $\overline{X16}$ through X1 are extended to FIG. 10 and each is the input of two respective inverters. Thus the X1 conductor for example, if high, causes both conductors $\overline{X1A}$ and $\overline{X1B}$ to go low. If bit X1 is a 0, $\overline{X1A}$ and $\overline{X1B}$ are 1's. The top half of the circuitry on FIG. 10 merely provides two conductors for carrying each bit value or its complement. These inverters are provided because many gates must be controlled in accordance with the same bit value and the output current from one of gates 922–929 may be insufficient for driving all of the controlled gates. For this reason two transistors are provided on FIG. 10 for each bit and another two for its complement in order that each of the transistors will have to drive less than all of the gates which must be controlled in accordance with the respective bit value.

The circuitry on the lower half of FIG. 10 is used to derive six control signals, Z14, Z17, Z15, Z19 (Z19A and Z19B are the same and two gates are used to duplicate the signal for driving a large number of controlled gates), Z20 and Z18. The legend on the drawing indicates the value of each control signal. For example, Z14 is normally high but goes low on a left shift if either X16 or X4 in the steering word (X16) (X8) (X4) (X2) (X1) is a 0. The operation of gate 1001 may be analyzed as follows. One of the inputs of the gate is dependent upon the value of HL. Normally HL is low and consequently Z14 is normally high. On a left shift however HL is high. The output of gate 1001 is thus controlled by the other input. The other input is the output of gate 1008. The two inputs to gate 1008 are X16 and X4. If both are 1's the output of gate 1008 is low and the output of gate 1001 is high. The output of gate 1008 is high, thus causing Z14 to go low, only if at least one of bits X4 and X16 is a 0. Consequently Z14 is normally high and goes low only on a left shift when either X16 or X4 is a 0 as shown in the drawing.

The output of gate 1002 is normally high because its input HL is normally low. On left shifts this input is high. Another of the inputs to this gate is the output of gate 1008. Thus for the output of gate 1002 to go low either X4 or X16 must be a 0 in addition to HL being high. The third input to gate 1002 is $\overline{X2}$. This input must also go high for the output to go low. Consequently Z17 is normally high and goes low only on a left shift if X2 is a 0 ($\overline{X2}$ is a 1) and at least one of X4 and X16 is a 0. Signals Z15 and Z19 may be analyzed in a similar manner.

Z20 and Z18 are controlled by conductor HR rather than conductor HL. Z20 is normally high and goes low on a right shift if X8 is a 1. Z18 is normally high and goes low on a right shift if X2 is a 1.

Before proceeding to an analysis of the actual combinational logic network which is controlled in accordance with the Z signals, these signals might be briefly examined. The signals and their complements may be expressed by the following Boolean equations:

$Z14=\overline{HL}+(X16)(X4)$ ....... $\overline{Z14}=HL(\overline{X16}+\overline{X4})$ $Z17=\overline{HL}+(X16)(X4)+X2$ ... $\overline{Z17}=HL(\overline{X16}+\overline{X4})\overline{X2}$ $Z15=\overline{HL}+X16$ ............. $\overline{Z15}=HL(\overline{X16})$ $Z19=\overline{HL}+X16+X8$ .......... $\overline{Z19}+HL(\overline{X16})X8$ $Z18=\overline{HR}+\overline{X2}$ ............. $\overline{Z18}=HR(X2)$ $Z20=\overline{HR}+\overline{X8}$ ............. $\overline{Z20}=HR(X8)$ Referring to the network of FIG. 3 it will be observed that the 20 dotted vertical paths are all blocked when the HL bit is a 1. But the blocking is unconditional only for the six paths 16C–16D and 4E–4F through 0E–0F. The other paths are blocked conditionally. Some of these paths are not blocked if X16 is a 1 and others are not blocked if the logical product (X16)(X4) is a 1 Z14 may be interpreted as a "blocking function." Z14 is used to conditionally block some of the dotted vertical paths. If Z14 is a 1 the path is not blocked. For example, blocking function Z14 is used to control transmission down the dotted vertical path 19A–19B which must be blocked on left shifts unless X4 and X16 are both 1's, i.e., unless a shift of 20 positions is required. It will be noted that Z14 is a 1 (to unblock the vertical paths) on all operations other than left shifts, in which case $\overline{HL}$ is a 1, and even on left shifts if X16 and X4 are both 1's. Similarly Z15 is a "blocking function" which controls the operation of some of the dotted vertical paths which must be blocked on left shifts unless X16 is a 1. Z15 is a 1 to unblock these vertical paths if the operation performed is not a left shift in which case $\overline{HL}$ is a 1, or even if the operation performed is a left shift provided X16 is a 1.

Z17 is similar to Z14 except for the addition of the X2 term. Z19 is similar to Z15 except for the addition of the X8 term. Z17 and Z19 are used to control the blocking of others of the dotted vertical paths. The additional two terms are required due to the peculiarities of the transistor gate used in the illustrative embodiment of the invention. The reason for using Z17 and Z19, each with an additional term will become apparent below. Similarly, Z18 and Z20 would be dependent only on HR were it not for the similar additional term included in each expression. The two signals, each including an additional term, are also required due to the peculiarities of the transistor gate employed in FIGS. 11–16 as will become apparent below.

Figure 11:
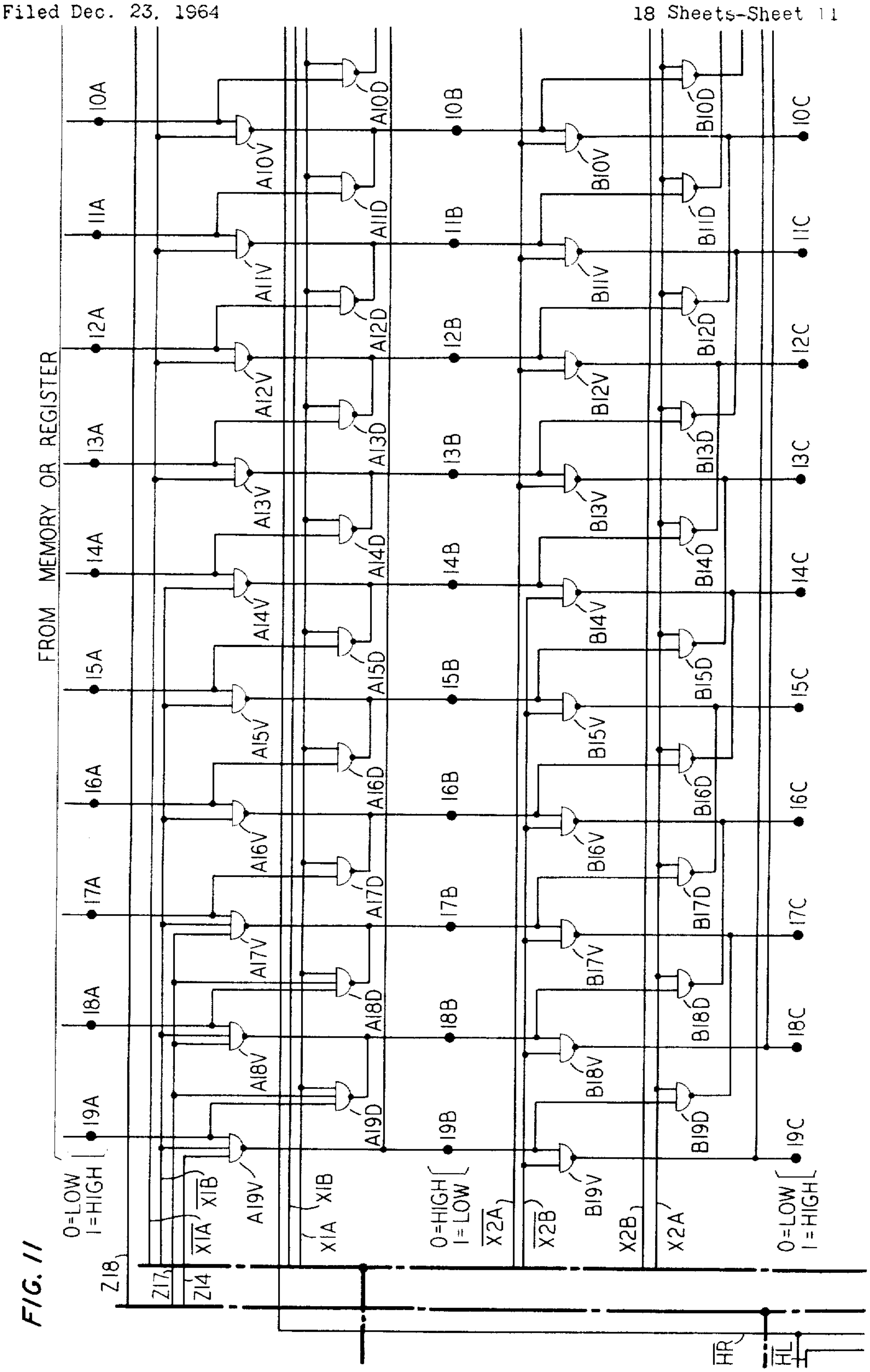
Figure 12:
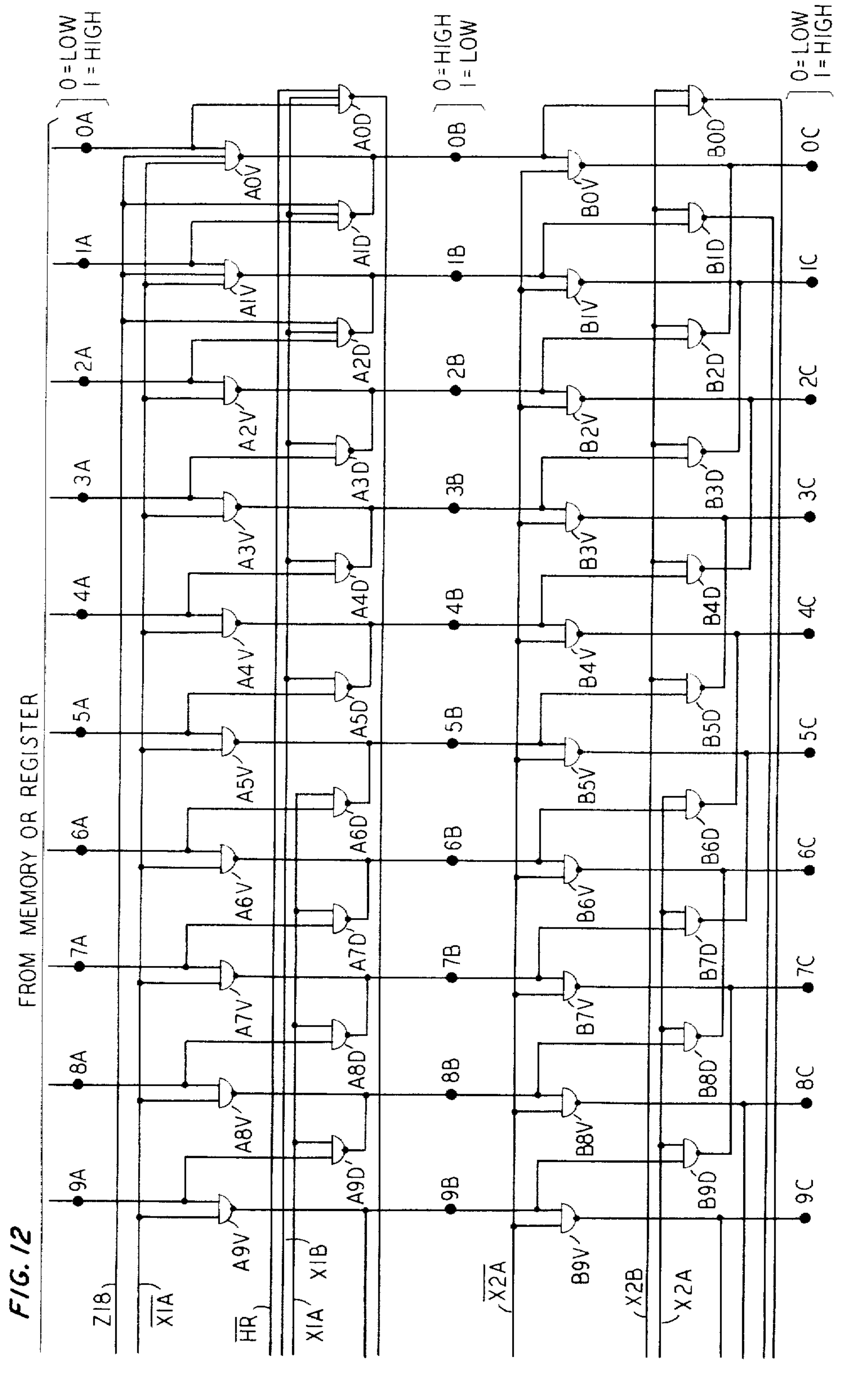
Figure 13:
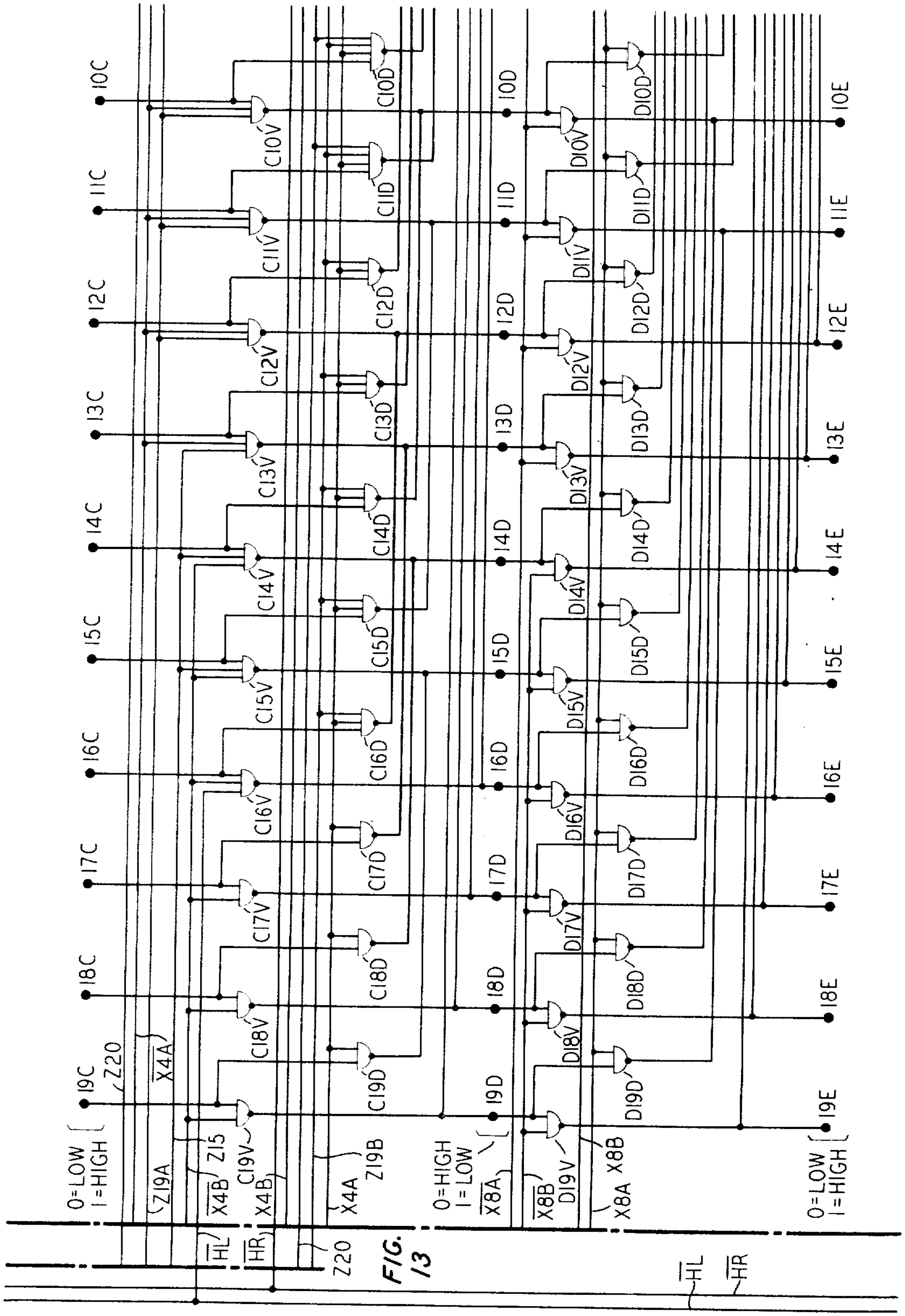
Figure 14:
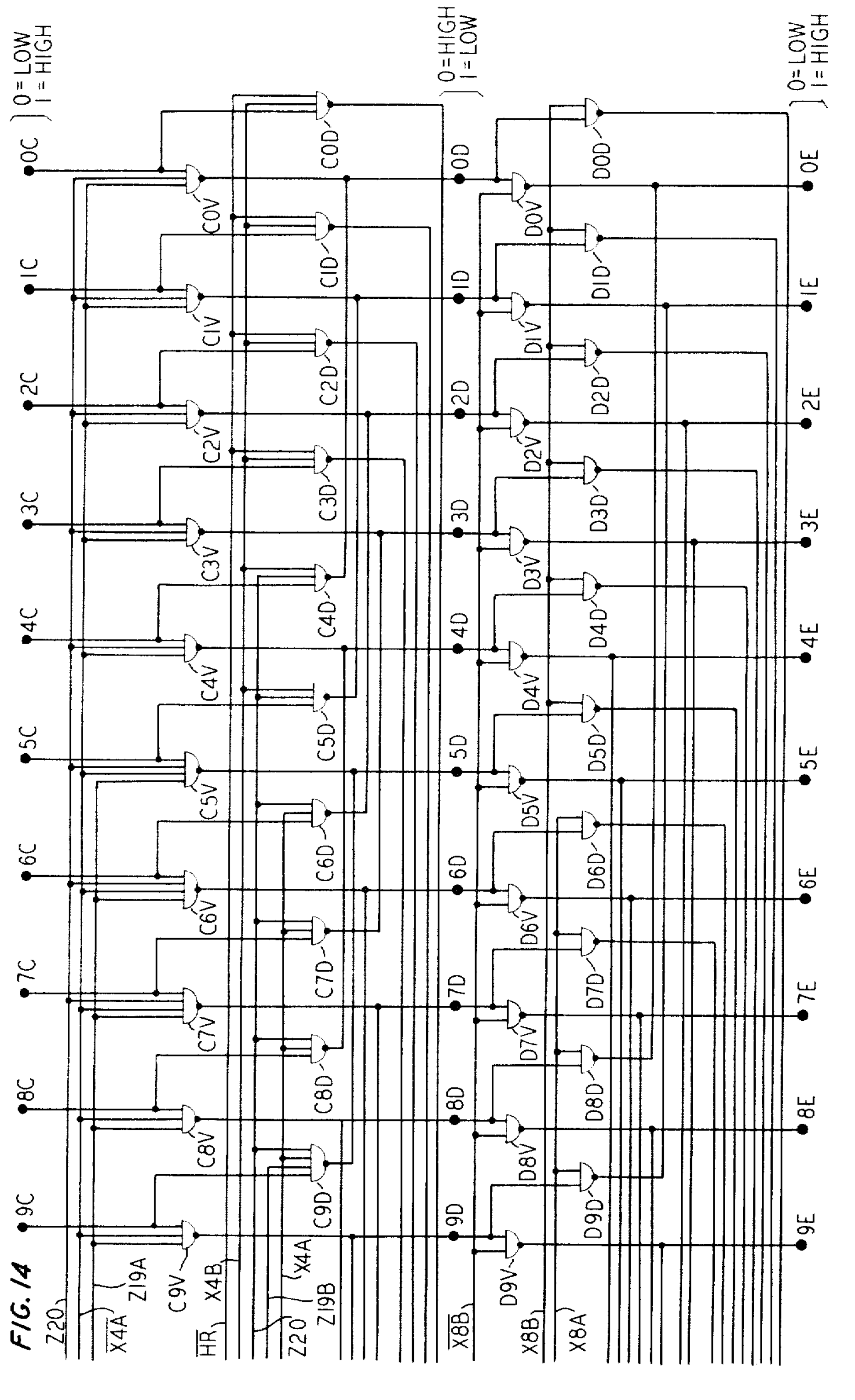

The shift and rotate circuit may be analyzed beginning with FIGS. 11 and 12 which contain all of the nodes in rows A, B and C. (The nodes in row C are also shown in FIGS. 13 and 14 for the sake of convenience. In fact, it must be remembered that the nodes in the drawing are merely points in the circuit and while convenient for descriptive purposes may not be identifiable in a physical circuit except by noting that they lie along respective conductors.) The input data word bits from memory 101 or one of the registers are applied at nodes 19A through 0A. A positive potential represents a 1 and a ground potential represents a 0. Connected to node 19A are two gates A19V and A19D. A19V is the gate which controls the transmission of the bit at node 19A to node 19B. Gate A19D controls the transmission of the bit at node 19A diagonally to node 18B. Similar remarks apply to the other 19 pairs of gates connecting the nodes in row A to the nodes in row B. Each of the V gates is connected between a node in row A vertically to the node in row B contained in the same column. Each of the D gates is connected diagonally between a node in row A and the node in row B in the adjacent column to the right.

Consider the simplest case in which the input data bits are being rotated to the right. All six of the Z control signals are high and exert no control over the gates to which they are applied. All of the gates in FIGS. 11 and 12 have at least two inputs. If one of the inputs is high the operation of the gate is determined solely by the value of the other input. For this reason, in analyzing the operation of the circuit when the bits are being rotated to the right, the six control signals or "blocking functions" need not be considered.

The two effective inputs for gate A19V are the steering function $\overline{X1B}$ and the data bit at node 19A itself. If X1 is a 0, $\overline{X1B}$ is a 1. Because X1 is a 0 the vertical path connecting node 19A to node 19B should be taken. Since $\overline{X1B}$ is high the operation of gate A19V is controlled solely by the value of the bit at node 19A. If this bit is a 0 the output of gate A19V is high and a 1 appears at node 19B. If the bit at node 19A is a 1 the output of gate A19V is low and a 0 appears at node 19B. Thus it is seen that although the bit at node 19A is transmitted vertically to node 19B it is inverted. For this reason while a low potential represents a 0 at the nodes in row A, a 0 is represented at the nodes in row B by a high potential. Similarly, while a 1 is represented by a high potential at the nodes in row A it is represented by a low potential at the nodes in row B. Node 19B terminates two transmission paths, the vertical from node 19A and the diagonal from node 0A. The potential at node 19B is controlled solely by the operation of gate A19V, when X1 is a 0. One of the inputs of gate A0D is X1B and since X1B is a 0 the output of gate A0D is high and is independent of the value of the data bit at node 0A. Thus node 19B is at a high potential (a 0) unless the output of gate A19V goes low. The output of gate A19V goes low only if the bit at node 19A is a 1. Consequently the potential of node 19B is high if a 1 at node 19A is transmitted vertically through gate A19V. Node 19B is low only if the bit at node 19A is a 1. In either event the potential or bit at node 19B is controlled exclusively by the potential or bit at node 19A.

If bit X1 is a 1 rather than a 0 the bits at the nodes in row A must be transmitted along the diagonal paths. Conductors $\overline{X1A}$ and $\overline{X1B}$ are both low. These conductors are connected to one input of each of the V gates connecting the nodes in row A to the nodes in row B. Consequently the output of each of the V gates is high (unless shorted to ground by the output of a D gate) and the potential at each of the nodes in row B is controlled solely by the operation of the D gate connecting the node to the node in row A in the adjacent column to the left. Conductors X1A and X1B are both high and since one of these conductors is connected to one of the inputs of each of gates A19D through A0D the operations of these gates are determined solely by the values of the other inputs. The other input of each gate is connected to one of the nodes in row A and consequently the potential at each of the nodes in row B is the inverse of the potential at the node in row A in the adjacent left column. For example, the potential at node 19B is controlled exclusively by the operation of gate A0D since the output of gate A19V is high. A 1 (low potential) appears at node 19B if a 1 (high potential) appeared at node 0A. A 0 (high potential) appears at node 19B if a 0 (low potential) appeared at node 0A.

Thus far in the analysis of the twenty V and twenty D gates connecting the nodes in row A to the nodes in row B the inputs to the gates that have been considered are only the bit values at the nodes in row A and the X1 and $\overline{X1}$ steering signals. Indeed, the other input signals are all high and exert no control over the gates when a right rotate operation is being performed. When a right shift operation is being performed the diagonal gate connecting node 0A to node 19B must be blocked. It will be noted that on a right shift the $\overline{HR}$ input to gate A0D is low. Consequently the output of this gate is high even if the diagonal step of 1 is taken. If the diagonal step of 1 is taken gate A19V does not operate and its output is high. Since the $\overline{HR}$ bit blocks gate A0D its output is high as well and node 19B is at a high potential. Thus on a right shift if the diagonal step of 1 is taken a 0 is automatically written at node 19B. If the vertical step of 1 is taken a 0 should not be automatically written at node 19B. While the output of gate A0D is high gate A19V may transmit a 1 from node 19A to node 19B. In such a case the potential of node 19B goes low.

To carry out a left shift operation, as seen from the table of transmission functions for the dotted vertical paths, path 19A–19B must be blocked unless X4 and X16 are both 1's. Blocking function Z14 is a 1 on all operations other than a left shift and thus exerts no control over gate A19V. However for a left shift Z14 is a 0 unless X16 and X4 are both 1's. If one of bits X16 and X4 is not a 1 Z14 is low. If Z14 is low the output of gate A19V is high no matter what the value of the bit at node 19A. Consequently if a vertical step of 1 is taken the output of gate A0D is high, as usual when a vertical step is taken, and the output of gate A19V is high because Z14 is low. The potential at node 19B is then high and a 0 is automatically written at this node independent of the value of the bit at node 19A. If on the other hand X16 and X4 are both 1's the vertical path should not be blocked. Since Z14 is high it exerts no control over gate A19V and the bit at node 19A is transmitted (after being inverted) to node 19B.

All of the various inputs to the 40 gates connecting the nodes in row A to the nodes in row B have been considered except the input Z17 which is applied to gates A19D, A18V, A18D and A17V, and the input Z18 which is applied to gates A2D, A1V, A1D and A0V. It would appear that further control over these eight gates is not required since all necessary operations of the paths connecting the nodes in row A to the nodes in row B of FIG. 3 have been realized in the circuit of FIGS. 11 and 12. In fact, blocking functions Z17 and Z18 are not required for controlling a proper step of 1 either vertically or diagonally. The additional control of gates A19D, A18V, A18D and A17V, and gates A2D, A1V, A1D and A0V, is required because of the peculiarities of the operation of gates connecting the nodes in row B to the nodes in row C. The reason for including Z17 and Z18 inputs for these eight gates will become apparent only after the next group of 40 gates is considered.

The scheme for the next group of 40 gates is similar to the one just considered. The major difference is that each of the diagonal gates connects a node in row B to a node in row C which is two positions away to the right, rather than only one position. Each of the vertical gates has as one of its inputs one of the steering signals $\overline{X2A}$ or $\overline{X2B}$, just as each of the vertical gates previously considered has as one of its inputs $\overline{X1A}$ or $\overline{X1B}$. Similarly each of the D gates is controlled by X2A or X2B just as each of the diagonal gates previously considered is controlled by the X1A or X1B.

Consider first the case of right rotation. If X2 is a 0 the outputs of all of the diagonal gates are high. Since $\overline{X2}$ is high one of the inputs of each of the vertical gates is high. Each of the vertical gates is thus controlled by the potential at the respective node in row B. The output of each of the vertical gates is the inverse of the potential at the respective node in row B. Thus a 0 at a node in row C is represented by a low potential and a 1 is represented by a high potential. The bit values at the nodes in row C are represented by the same potentials as those at the nodes in row A, which are the inverse of those at the nodes in row B.

The operation of the gates connecting the nodes in row B to the nodes in row C is similar to the operation of the gates connecting the nodes in row A to the nodes in row B when a right rotate operation is being performed. It will be observed that each of the gates connecting a node in row B to a node in row C has only two inputs. There are no control signals on right shifts for blocking the diagonal paths corresponding to those paths in FIG. 3 which cross L—L and for conditionally blocking paths 18B–18C and 17B–17C on left shifts. Both types of control are of course necessary but the gates connecting the nodes in row B to the nodes in row C may not be controlled by the Z blocking functions. The reason for this is as follows. The only way the basic gate is used in the circuit may be blocked is to apply a ground potential to one of its inputs. In blocking a gate it is necessary to insure that the output of the gate is the same no matter what the value of the input bit applied to the other input or inputs of the gate. If a low potential is applied to one of the inputs of the gate to block it, the output is high no matter what the value of the input bit applied to the other inputs of the gate. But if it is attempted to block the gate by applying a high potential to one of its inputs the output is not independent of the potentials applied to the other inputs of the gate. The output of a gate may be controlled to be independent of the value of other input bits only if a ground potential is applied to one of the gate inputs. If it is attempted to block a vertical or diagonal gate connecting a node in row B to a node in row C by the use of a low potential at one of its inputs the output will be high. The potential at the node in row C terminating the transmission path will thus be high. But a high potential at a node in row C represents a 1 and, when a path is blocked, a 0 must be written at the terminating node. Since a 0 is represented by a high potential at a node in row C and there is no way to absolutely block a gate and also insure that its output is low, the 40 gates connecting the nodes in row B to the nodes in row C may not be blocked as required to control proper operation on right shifts and left shifts. For this reason additional blocking functions are applied to the gate connecting the nodes in row A to the nodes in row B.

Consider first the case of a right shift. The two paths which must be blocked when a diagonal step of 2 is taken are 0B–18C and 1B–19C. As described above there is no way to block gates B0D and B1D (at one of their inputs) as required. Instead of blocking these gates the bits written at nodes 0B and 1B are made 0's if X2 is a 1. In other words the bits which will end up at nodes 18C and 19C (the bits coming from nodes 0B and 1B) are made 0's not at the second stage of the circuit but rather at the first stage of the circuit. The bit transmitted to node 0B comes from either node 0A or node 1A. A 0 (high potential) may be guaranteed at node 0B by controlling gates A0V and A1D to go high automatically if X2 is a 1. The condition $X2=1$ must be imposed because it is desired to force a 0 on node 0B only when the diagonal path from 0B to 18C is active and not when the path from 0B to 0C is active. No blocking is desired unless the diagonal paths have been chosen in the second stage of the network. Blocking function Z18 is of the form $\overline{HR}+\overline{X2}$. Z18 is low when a right shift operation is being performed and X2 is a 1. Consequently the outputs of A0V and A1D automatically go high independent of the values of the bits at nodes 0A and 1A and independent of the value of X1 thus guaranteeing the transmission of a 0 through gate B0D from node 0B to 18C. Similarly, the bit at node 1B can come from either node 1A or node 2A depending on the value of X1. Z18 is an input of each of the gates A1V and A2D and by controlling each of these gates to go high when a right shift operation is performed and X2 is a 1, a 0 (high potential) is automatically written at node 1B. Consequently during the step of 2 during a right shift there is no need to control gates B1D and B0D because the bits transmitted through these gates and written at nodes 19C and 18C are 0's as required. Blocking may be performed on the gates connecting the nodes in row A to the nodes in row B because a 0 (high potential) may be automatically written at the nodes in row B by applying a low potential to one of the inputs at the respective gates terminating at these nodes. It should be noted that blocking function Z18 includes an $\overline{X2}$ term. This is essential. If X2 is a 0 gates B1D and B0D do not operate to begin with. Gates B1V and B0V operate to transmit the respective bits at nodes 1B and 0B (after inverting them) to respective nodes 1C and 0C. The bits written at nodes 1B and 0B should not necessarily be 0's since these bits should not be shifted out of the system due to the X2 bit. Consequently gates A2D, A1V, A1D and A0V which control the writing of bits at nodes 1B and 0B should not be blocked unless X2 is a 1. If X2 is a 0, Z18 is high and exerts no control over these four gates as required.

The blocking for the two vertical paths 18B–18C and 17B–17C is accomplished in a similar manner. The bits transmitted through vertical gates B18V and B17V originally appear at nodes 18B and 17B. Instead of blocking B18V and B17V, 0's (high potentials) are written at nodes 18B and 17B. Blocking function Z17 is connected to one of the inputs of each of gates A19D, A18V, A18D and A17V. These are the four gates which control the writing of bit values at nodes 18B and 17B. Z17 goes low on left shifts if X2 is a 0 provided at least one of X16 and X4 is a 0. It is to be recalled that the two vertical paths 18B–18C and 17B–17C are to be blocked conditionally on left shifts; the paths are to function if bits X16 and X4 are both 1's. If X16 or X4 is a 0 the paths are to be blocked when a vertical step of 2 is taken. When all three terms comprising Z17 are 0's the output of each of the four gates A19D, A18V, A18D and A17V is high and 0's are automatically written at nodes 18B and 17B. The X2 term in Z17 is essential; the vertical paths 18B–18C and 17B–17C should be blocked on left shifts only if X2 is a 0. If X2 is a 1 the bits at nodes 18B and 17B are to be transmitted over the diagonal paths. Thus if X2 is a 1 0's cannot be automatically written at nodes 18B and 17B since the bit values at these nodes should be those properly received from respective nodes in row A and should be properly transmitted over diagonal paths to nodes of row C. If X2 is a 1, Z17 is high and exerts no control over gates A19D, A18V, A18D and A17V as required.

Thus the gates corresponding to the diagonal paths crossing L—L and the vertical paths crossing D—D in FIG. 3 which are connected between rows B and C are not blocked directly to control right and left shifts. The proper transmission paths are made to appear inoperative (or "blocked" from a functional point of view) by blocking suitable ones of the gates between rows A and B.

The top half of each of FIGS. 13 and 14 shows gates connecting the nodes in row C to nodes in row D. The operation of these gates is similar to those at the top of FIGS. 11 and 12. The major difference in the arrangement is that each diagonal gate connects two nodes which are four positions apart rather than only one. As with the gates at the top of FIGS. 11 and 12 the blocking for right shifts and left shifts is performed on the gates themselves rather than on gates one level above. A 0 is represented at a node in row D by a high potential. Blocking is possible between the nodes in row C and the nodes in row D because a low signal applied to an input of a gate automatically controls a high output (a 0) at the terminating node.

The operation of the gates connecting the nodes in row C to the nodes in row D will be considered without reference to blocking functions Z19 and Z20. These blocking functions are required only because the gates at the next level may not be blocked to control the automatic writing of 0's at the nodes in row E on right shifts and left shifts. For the moment however it will be assumed that both blocking functions Z19 and Z20 are 1's and exert no control over the gates connecting the nodes in row C to the nodes in row D.

On right rotate operations $\overline{HR}$ and $\overline{HL}$ are both 1's and exert no control over the gates. Consequently each gate is provided with only two effective inputs, one of the inputs being an X4 or $\overline{X4}$ steering bit and the other being a data bit at a respective node in row C. The diagonal gates control the shifting of the bits if X4 is a 1 to nodes in row D which are four positions to the right of respective nodes in row C. Again, if a vertical step is taken X4A and X4B are both 0's and the outputs of all the diagonal gates are high. The potential of each node in row B is thus controlled only by the output of the respective vertical gate connected to it. Each of the vertical gates then has an $\overline{X4A}$ or a $\overline{X4B}$ input which is a 1. These inputs exert no control over the vertical gates and the vertical gates function as inverters in transmitting the bits at the nodes in row C to the nodes in row D in the same columns. Since the vertical gates function as inverters the potentials representing the two bit conditions at the nodes in row D are the reverse of those representing the bit conditions at the nodes in row C. At row D a 1 is represented by a low potential and a 0 is represented by a high potential.

If, on the other hand, a diagonal step of 4 is required $\overline{X4A}$ and $\overline{X4B}$ are both 0's. The vertical gates are all blocked, their outputs are all high, and the potentials at the nodes in row D are consequently controlled solely by the operations of the diagonal gates. X4A and X4B are both high and consequently exert no control over the diagonal gates. Each diagonal gate serves as an inverter and is controlled solely by the bit value at the originating node in row C. The bit is inverted and transmitted to the respective node in row D four positions to the right.

Referring to FIG. 3 it is seen that when a step of 4 is taken on a right shift operation, the four paths 3B–19D through 0B–16D must be blocked, i.e., 0's must be automatically written at nodes 19D through 16D. When a right shift operation is performed $\overline{HR}$ is a 0. This bit is one of the inputs of each of the four gates C3D through C0D. The outputs of these four gates are high no matter what the values of the respective bits at nodes 3C through 0C. Thus, no matter what the value of these bits 0's are written at nodes 19D through 16D if X4 is a 1.

The dotted vertical paths 16C–16D through 13C–13D are the four which must be blocked when a left shift operation is performed. Referring to the table of transmission functions presented above it will be noted that path 16C–16D is unconditionally blocked on all left shifts. The other three vertical paths are conditionally blocked on left shifts; they are not to be blocked if X16 is a 1. The $\overline{HL}$ bit is an input to vertical gate C16V. This bit is a 0 on all left shifts and consequently the vertical path 16C–16D is unconditionally blocked on all left shifts. The three vertical gates C15V through C13V each has as one of its inputs the Z15 blocking function bit. The Z15 blocking function is $\overline{HL}$+X16. Z15 is high on all operations other than left shifts. But if HL is a 1, Z15 is high only if X16 is a 1. If X16 is not a 1, Z15 is low and the three vertical gates are blocked to control the automatic writing of 0's at nodes 15D–13D if X4=0.

The three signals $\overline{HL}$, $\overline{HR}$ and Z15 are the only ones which would be required to control the proper operations of the gates connecting the nodes in row C to the nodes in row D were it possible to directly block the gates connecting the nodes in row D to the nodes in row E. These latter gates may not be blocked, however, and for this reason blocking functions Z19 and Z20 are also applied to various ones of the gates in the top half of FIGS. 13 and 14.

Referring to the gates connecting the nodes in row D to the nodes in row E it is seen that their arrangement is similar to that of the gates connecting the nodes in row B to the nodes in row C. The major difference is that each diagonal gate is connected between two nodes eight positions apart rather than only two positions apart. The operations of the gates connecting the nodes in row D to the nodes in row E are identical to the operations of the gates connecting the nodes in row B to the nodes in row C except that they are controlled by steering bits X8 and $\overline{X8}$ rather than bits X2 and $\overline{X2}$.

Referring to FIG. 3 it is seen that eight diagonal paths 7D–19E through 0D–12E must be blocked on right shifts. The eight diagonal gates D7D through D0D may not be blocked, however. The blocking of a gate implies that a 0 is written at the terminating node. A 0 at a node in row E is represented by a low potential. There is no potential which may be applied to one of the inputs of the basic gate circuit used in the illustrative embodiment of the invention which will always control the output to be low independent of the potential of the other inputs. If a low potential is applied to one of the inputs, the output is high, rather than low, under all conditions. And if a high potential is applied to one of the inputs the output is low only if the other input is high. There is no way to absolutely control a low output by applying a blocking function to only one of the inputs of a gate. For this reason the gates connecting the nodes in row D to the nodes in row E may not be blocked. Instead of blocking these gates the circuit is arranged to automatically control the writing of 0's at the nodes in row D which are connected through gates to nodes in row E which terminate the paths which should be blocked. Thus instead of blocking diagonal paths 7D–19E through 0D–12E the circuit is arranged to automatically control the writing of 0's at nodes 7D through 0D whenever a diagonal step of 8 is to be taken. By writing 0's at these nodes the diagonal paths need not be blocked because the 0's are transmitted through the diagonal gates to nodes 19E through 12E which are the nodes at which 0's must appear if X8 is a 1. Blocking function Z20 is an input of each of the eight vertical gates C7V through C0V and each of the eight diagonal gates C11D through C4D. Blocking function Z20 is equal to $\overline{HR}$+$\overline{X8}$. On all operations other than right shifts Z20 is a 1 and exerts no control over the 16 gates to which it is an input. However, on right shifts Z20 is a 0 if X8 is a 1. In this case the 16 gates to which Z20 is connected as an input are all blocked and the outputs of these gates are all high. Eight of these 16 gates are blocked anyway because one of bits X4 and $\overline{X4}$ is a 0. However even the eight of these gates which are not blocked and normally function to transmit bits through them are blocked due to the Z20 blocking function. These 16 gates are the ones which are connected to the eight nodes 7D through 0D. Thus no matter what the value of the X4 steering bit, 0's are automatically written at nodes 7D through 0D because the X8 bit is a 1 and at the end of the next diagonal step 0's must appear at nodes 19E through 12E as desired.

On left shifts the eight vertical paths 12D–12E through 5D–5E must be conditionally blocked. As seen from the table of transmission functions above these paths must all be blocked on left shifts unless X16 is a 1. Since it is not possible to block the eight vertical paths D12V through D5V by applying either potential to only one input of each gate, instead of blocking the gates, 0's are written at nodes 12D through 5D whenever a left shift operation is being performed and X16 is not a 1. The bits written at nodes 12D through 5D come from either gates C12V through C5V or from gates C16D through C9D. These 16 gates are controlled by blocking function Z19 to control the writing of 0's at nodes 12D through 5D whenever a left shift operation is performed and X16 is a 0. The Z19 blocking function is $\overline{HL}+X16+X8$. The first two terms are sufficient for controlling Z19 to be a 0 and to block the gates when X16 is a 0 on left shifts. However the X8 term is also necessary. If X8 is a 1 the eight dotted vertical paths 12D–12E through 5D–5E are not taken. Instead the eight diagonal paths from nodes 12D through 5D are taken. If the diagonal paths are taken 0's should not be written at nodes 12D through 5D independent of the values of the bits which would ordinarily be transmitted to these nodes through the 16 gates being considered. Consequently if X8 is a 1 blocking functions Z19A and Z19B should not control the automatic writing of 0's at nodes 12D through 5D because the original bit values at the nodes in row C which are transmitted to these nodes in row D must next be transmitted along diagonals to respective nodes 4E through 17E. For this reason blocking function Z19 (Z19A and Z19B) contains an X8 term. Z19 is a 0 on left shifts if X16 is a 0 only if X8 is a 0 as well and the diagonal paths 12D–4E through 5D–17E should not be taken. In FIGS. 13 and 14 the Z19A bit is applied to one of the inputs of each of gates D12V through D5V and the Z19B bit is applied to one of the inputs of each of gates D16D through D9D to control the blocking of these gates.

Figure 15:
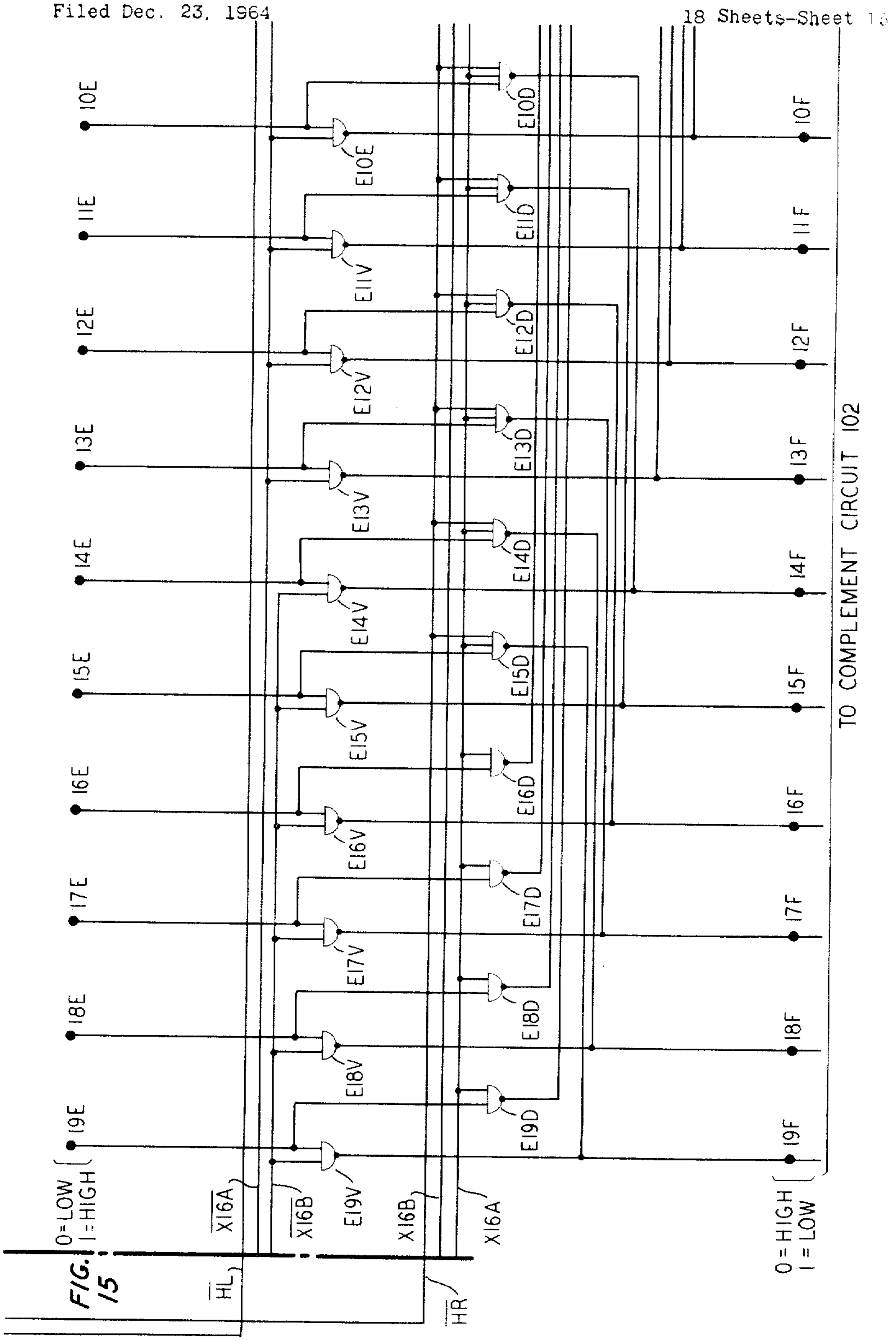
Figure 16:
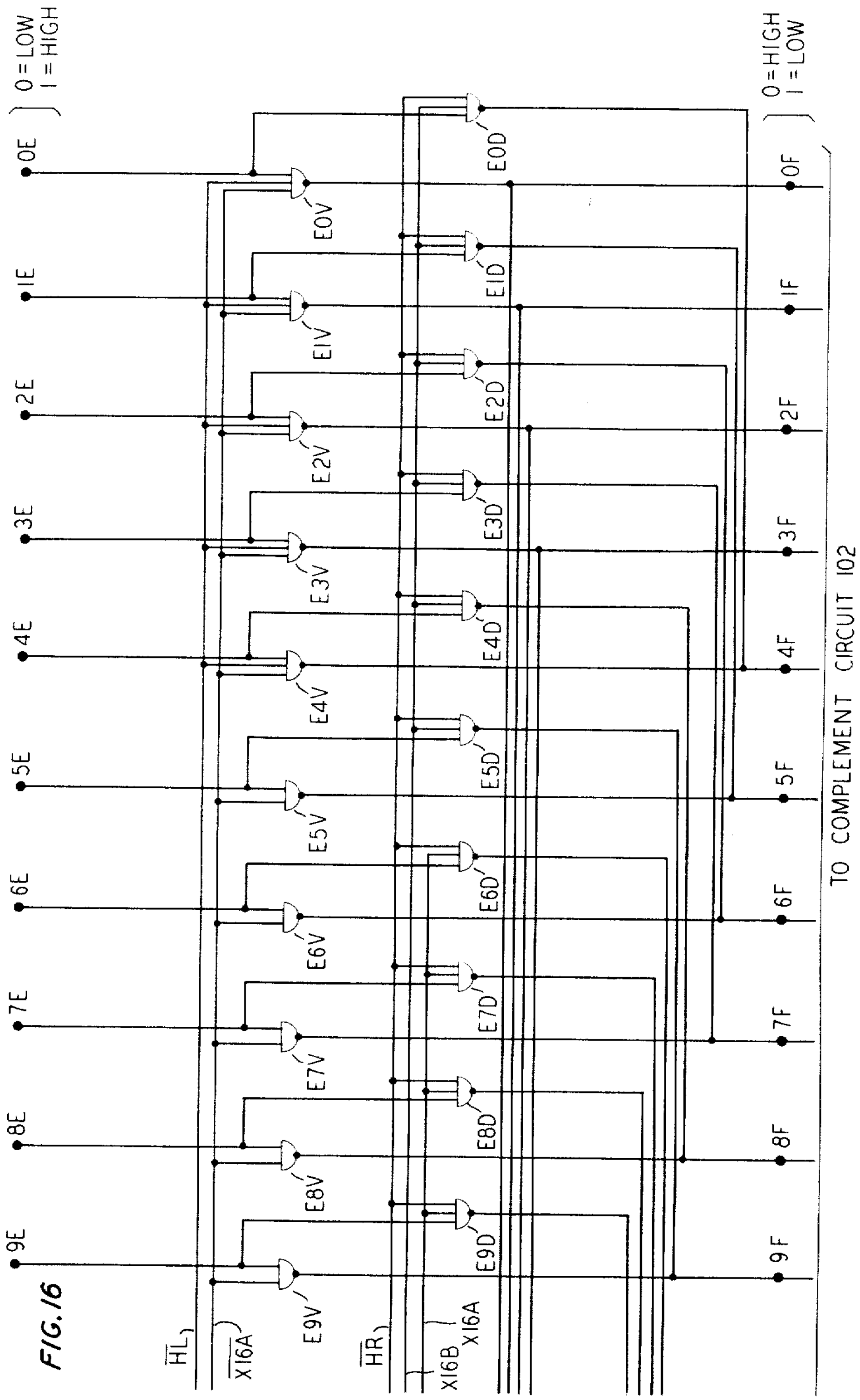

The 40 gates on FIGS. 15 and 16 control the shifting of the bits 16 positions to the right from the nodes in row E to respective nodes in row F if X16 is a 1. The arrangement of the gates is similar to the arrangements of the gates between the nodes in rows A and B and the nodes in rows C and D except that each diagonal gate connects a node in row E to a node in row F 16 positions to the right rather than only four positions or one position. Since a 0 at a node in row F is represented by a high potential the gates on FIGS. 15 and 16 may be blocked rather than requiring the blocking of gates in the preceding level. By applying a low potential to one of the inputs of a gate on FIGS. 15 and 16 a 0 appears at the terminating node independent of the value of the bit applied to any other input of the gate.

On a right shift as seen from FIG. 3 the 16 rightmost diagonal gates must be blocked. Bit $\overline{HR}$ is an input to each of the 16 rightmost diagonal gates E15D through E0D. The outputs of these gates are all high on right shifts. These gates are connected to nodes 19F through 4F. If X16 is a 1, $\overline{X16A}$ and $\overline{X16B}$ are 0's and the outputs of the vertical gates connected to these same nodes are also high. High potentials thus appear at nodes 19F through 4F as required. If X16 is a 0, 0's should not be automatically written at nodes 19F through 4F. The outputs of the 16 diagonal gates connected to these nodes are high because bits X16A and X16B are low as well as bit $\overline{HR}$. But the 16 vertical gates connected to these nodes function as inverters because bits $\overline{X16A}$ and $\overline{X16B}$ are 1's. The final bit values appearing at nodes 19F through 4F are those originally appearing at nodes 19E through 4E.

As seen from FIG. 3 the dotted vertical paths which must be blocked on left shifts are paths 4E–4F through 0E–0F. These paths, like path 16C–16B, are unconditionally blocked for left shifts. The outputs of the vertical gates connected to nodes 4F through 0F are always high on left shifts. Bit $\overline{HL}$ is low when a left shift operation is being performed and since this bit is one of the inputs of each of gates E4V through E0V the outputs of these gates are all high on left shifts as required.

The final shifted or rotated word appears at nodes 19F through 0F. The potentials representing the bit values are the reverse of the potentials representing the bits in the original data word appearing at nodes 19A through 0A. In FIG. 1 complement circuit 102 may be used to complement each bit, i.e., to replace each positive potential by a ground potential and each ground potential by a positive potential, if the uncomplemented shifted or rotated data word must be stored in one of the system registers.

It is thus seen that there may be two stages of complexity in the design of an electronic shift and rotate circuit in accordance with the principles of my invention. First, the design is more complex if the number of bits to be shifted or rotated is not a power of two since in this case some of the vertical paths have to be blocked conditionally rather than unconditionally on left shifts. Second, while the relay circuit implementation of the network is fairly straight forward the same may not be said of the electronic design. If gates such as that employed in the illustrative embodiment of the invention are used the paths at alternate levels may not be blocked for right shifts and left shifts as required. Instead additional blocking must be performed at the other alternate levels.

The design procedure for providing left shift capability in a network primarily designed for right rotate operations is as follows. First the network is drawn in a "straight line" type representation such as that in FIG. 3 and the lines D—D and L—L are drawn. The vertical paths crossing D—D are then considered. These paths are blocked tentatively for all left shift operations. Transmission is re-established on any of these paths if conditions exist whereby a valid shift magnitude word must cause a 1 to subsequently cross L—L even if the vertical path is taken. In designing an electronic circuit, if the type of logic circuit used precludes the application of path-blocking gating signals on the desired paths, the path-blocking gating signals must be applied to the paths in an adjacent level in the network. In the illustrative embodiment of the invention the path-blocking signals are applied to the two paths which feed signals to the path which must be blocked. It is also possible to allow transmission through the paths which must be blocked and to then block both paths which accept signals from the path which must be blocked.

In the illustrative embodiment of the invention the input data word at the nodes of row A is such that a 0 is represented by a low signal and a 1 is represented as a high signal. Each subsequent stage of the circuit of FIGS. 11 through 16 inverts the polarity of the data word. Blocking of paths in the circuit is accomplished by placing low signals at an input of certain gates between nodes of rows A and B, C and D, and E and F because it is at the gates between these pairs of nodes that the paths may be disabled in such a manner as to force a 0 to be propagated to the remainder of the circuit. If in other systems the input data word is of the opposite polarities (i.e., 0 represented by a high signal and 1 represented by a low signal) then the blocking of paths would be done prior to nodes of row A, between rows B and C, and between nodes D and E in FIGS. 11 through 16. The blocking of paths in the circuit of FIGS. 11 through 16 to accomplish right and left shifts is summarized in the tables of FIGS. 17 and 18. In FIG. 17 the transmission functions for the paths which are blocked to accomplish right shifts are shown. (Z18 and Z20, used in the "alternate expressions," are defined in FIG. 18.) There are 31 entries for the 31 diagonal paths crossing L—L. It will be recalled that the blocking signals for the paths connecting the nodes in row B to the nodes in row C and the nodes in row D to the nodes in row E are applied not to the gates connected between these groups of nodes but rather to the gates in the preceding levels. FIG. 17 includes a column which shows the path to which the blocking is applied in order to produce blocking on the desired path. The next three columns show the various terms comprising each of the transmission functions. Alternate expressions for some of the transmission functions are given in the rightmost column. It will be recalled that blocking function $Z18=\overline{HR}+\overline{X2}$ and blocking function $Z20=\overline{HR}+\overline{X8}$ are derived by the circuitry on FIG. 10.

Consider first path 0A–19B, the only diagonal path crossing L—L which connects a node in row A to a node in row B. Gate A0D, in addition to a data bit iuput, has an X1 input and an $\overline{HR}$ input. The X1 bit is a "steering term." This bit is used to allow the bit at node 0A to be transmitted through gate A0D to node 19B if X1 is a 1. If X1 is a 0 the output of A0D is high and gate A0V tranmits the data bit instead. The $\overline{HR}$ term in the first transmission function blocks gate A0D on a right shift even if X1 is a 1. Consequently the combined transmission function for gate A0D is X1 ($\overline{HR}$). The actual operation of any one of the gates may be described by forming the product of its transmission function and the value of the data bit applied to the remaining input. If the product of the data bit and the transmission function is a 1 the output is a 1. If the transmission function is a 0 or the data bit is a 0, the output is a 0.

Two diagonal paths between the nodes in row B and the nodes in row C cross L—L. Consider first diagonal 0B–18C. Blocking may not be applied to gate B0D connected between the two nodes. Instead a 0 is written at node 0B when X2 is a 1 by blocking paths 1A–0B and 0A–0B. The steering term for path 1A–0B is X1 since gate A1D is to transmit a bit through it when X1 is a 1. The blocking is controlled by the $\overline{HR}$ bit. If $\overline{HR}$ is a 0 the path should be blocked because a right shift is being performed. However, path 1A–0B should be blocked only if X2 is indeed a 1. For this reason the $\overline{X2}$ term is included in the transmission function. The final expression for the transmission function is $X1[\overline{HR}+\overline{X2}]$. If X1 is a 1 gate A1D transmits the data bit at node 1A to node 0B. This bit is transmitted, however, only if any operation other than a right shift is being performed, or if a right shift is being performed and X2 is a 0. The alternate expression for the transmission function is X1(Z18). Similar remarks apply to path 0A–0B except that the steering term is $\overline{X1}$ rather than X1 since gate A0V operates rather than gate A0D if X1 is a 0. The transmission functions for paths 2A–1B and 1A–1B to produce the blocking required for path 1B–19C are the same as the previous pair.

The four diagonals crossing L—L which connect nodes in row C to nodes in row B have transmission functions of the form (X4)($\overline{HR}$). The four diagonal gates C3D through C0D transmit bits through them if X4 is a 1 but only if HR is a 0, i.e., the data word is not being shifted to the right.

The next group of diagonal paths to be considered are the eight crossing L—L which connect nodes in row D to nodes in row E. The gates in these paths may not be blocked directly and blocking for these paths takes place in the level above in the two paths connected to each of nodes 7D through 0D. The blocking function for each of the diagonal paths 4C–0D through 11C–7D is $X4\ [\overline{HR}+\overline{X8}]$. The steering term is X4 since the diagonal paths between the nodes in rows C and D are used if a diagonal step of 4 is to be taken. However these paths must be blocked, i.e., their transmission function must be a 0, on right shifts if X8 is a 1. On all operations other than a right shift $\overline{HR}$ is a 1 and the transmission function reduces to X4. Even on right shifts, if X8 is a 0 indicating that the bits at nodes 7D–0D are not to be shifted out of the system, the transmission function reduces to X4 since the eight diagonal gates C4D through C11D must then operate in the normal fashion. Only if the eight bits at nodes 0D through 7D are to be shifted out of the system is the transmission function for paths 4C–0D through 11C–7D a 0 independent of the value of X4. In a similar manner the eight vertical paths 0C–0D through 7C–7D are blocked on right shifts if X8 is a 1. The transmission function for these gates is the same as the one for the diagonal gates except that the steering term is $\overline{X4}$ rather than X4.

If X16 is a 1 the 16 diagonal gates 0E–4F through 15E–19F must be blocked on right shifts. The transmission function for these 16 diagonal paths is thus (X16)($\overline{HR}$).

FIG. 18 is similar to FIG. 17 but depicts the transmission functions of the paths which are blocked to accomplish left shifts. The alternate expressions for the transmission functions include Z14, Z17, Z15 and Z19 terms. These functions are derived by the circuitry on FIG. 10.

Path 19A–19B must be blocked on left shifts unless X16 and X4 are both 1's. The steering term for this gate is $\overline{X1}$. Even if X1 is a 0 however the output of the gate is high (a 0) if HL is a 1—unless X16 and X4 are both 1's.

The vertical gates along paths 18B–18C and 17B–17C may not be blocked directly. These two paths must be blocked on all left shifts unless X16 and X4 are both 1's, and the blocking term $\overline{HL}+(X16)(X4)$ is used to control the two gates connected to each of nodes 18B and 17B. Each of these four gates includes in its transmission function one of the steering terms X1 or $\overline{X1}$. The four paths 19A–18B, 18A–18B, 18A–17B and 17A–17B should be blocked unless the diagonal step of 2 is indeed to be taken in going from the nodes of row B to those of row C. If X2 is a 1 the bits transmitted to nodes 19B and 18B should be those ordinarily transmitted when no paths are blocked. For this reason the transmission function for the four paths which are blocked include an X2 compensating term. The transmission function is a 1 if X2 and the steering term are both 1's.

Consider next the four vertical paths connecting the nodes in row C to the nodes in row D which must be blocked on left shifts. Path 16C–16D must be unconditionally blocked on all left shifts. Accordingly the transmission function for gate C16V is merely ($\overline{X4}$)($\overline{HL}$). The three paths 15C–15D through 13C–13D must be blocked on left shifts unless X16 is a 1. Accordingly the blocking term for each of gates C15V through C13V is $[\overline{HL}+X16]$. None of the four transmission functions for gates C16V through C13V requires a term to compensate for blocking which takes place in paths other than the required ones because these gates may be blocked directly.

The same is not true however for the eight vertical paths 12D–12E through 5D–5E. These vertical paths may not be blocked directly and instead the blocking for each path is accomplished in the two paths feeding into it. The blocking term is again $\overline{HL}+X16$ since the eight vertical paths must be blocked on all left shifts unless X16 is a 1. Each of the two paths feeding each path for which blocking is desired includes one of the steering terms X4 and $\overline{X4}$ since the actual blocking is accomplished in the vertical and diagonal paths connecting the nodes in row C to the nodes in row D. Each blocking function further includes an X8 term. Even if a left shift is being performed and even if X16 is a 0 the vertical and diagonal paths connecting the nodes in row C to the nodes in row D should not be blocked if the vertical paths between the nodes in row D and the nodes in row E are not to be taken. If the diagonal paths are to be taken between the nodes in row D and the nodes in row E, 0's should not automatically be written at nodes 12D through 5D. Accordingly each of the transmission functions includes an X8 compensating term.

The last group of vertical paths which must be blocked on left shifts are the five paths 4E–4F through 0E–0F. These paths are to be blocked unconditionally on all left shifts and the blocking term is accordingly merely $\overline{HL}$. Since the five vertical gates E4V through E0V may be blocked directly there is no need for a term to compensate for blocking at other than the desired paths and the transmission function for the five vertical gates is simply $(\overline{X16})(\overline{HL})$.

Although the invention has been described with reference to specific embodiments it is to be understood that the above-described ararngements are merely illustrative of the principles of the invention. Numerous modifications may be made therein and other arrangements may be devised without departing from the spirit and scope of the invention.

What is claimed is:

1. A combinational logic circuit comprising a group of input nodes, a group of output nodes, a plurality of groups of intermediate nodes, a plurality of pairs of transmission path means connecting each of said input nodes to two respective ones of said intermediate nodes and connecting each of said intermediate nodes to two respective ones of said intermediate or output nodes, means for applying signals representative of the bits in a data word to said input nodes, means for selectively and simultaneously controlling the operation of only one of the transmission path means in each of said pairs to transmit said signals from said input nodes to said output nodes, two of said transmission path means, each of a different one of said pairs of transmission path means, being connected to each of said intermediate and output nodes, means for representing a shift operation or a rotate operation to be performed on the bits in said data word, and means responsive to a shift operation being represented for inhibiting the operation of selected ones of said transmission path means otherwise operated by said controlling means.

2. A shift and rotate circuit comprising $n$ input conductors each containing a bit signal of an input data word thereon, $n$ output conductors, a plurality of groups of $2n$ transmission paths each, means for connecting each of said input conductors to a respective two of the transmission paths in a first one of said groups, means for connecting pairs of said transmission paths in a last one of said groups to respective ones of said output conductors, means for connecting pairs of transmission paths in each of the remaining groups to two respective pairs of transmission paths in a first respective one of said groups and for connecting said pairs of transmission paths in each of said remaining groups to a respective two of the transmission paths in a second respective one of said groups, means for simultaneously controlling $n$ of the transmission paths in each of said groups to be operative to transmit a bit signal therethrough in accordance with the magnitude of the shift or rotate operation required, means for inhibiting the operation of predetermined ones of said transmission paths when said data word is to be shifted in a first direction, and means for selectively inhibiting the operation of predetermined others of said transmission paths when said data word is to be shifted predetermined numbers of positions in the second direction.

3. A shift and rotate circuit in accordance with claim 2, wherein said plurality of transmission path groups includes a maximum of $(n-2)$ groups.

4. A shift and rotate circuit in accordance with claim 2, wherein $n$ is equivalent to a number other than an interger power of 2.

5. A shift and rotate circuit comprising a sequence of groups of $n$ nodes each, said nodes in each group having an ascending order of significance; a plurality of groups of $2n$ transmission paths each, $n$ transmission paths in each of said groups being connected between nodes of the same significance in two respective ones of said groups of nodes, the remaining $n$ transmission paths in each of said groups being connected between nodes of differing significances in the same respective two groups of nodes, all of the $n$ transmission paths in each of said groups connected between nodes of differing significances being connected between two nodes whose difference in significance is the same; means for applying $n$ bit signals of an input data word to respective nodes in a first of said groups; means for representing the type of operation to be performed, its direction and magnitude; means simultaneously for controlling only one of the two groups of $n$ transmission paths in each group of $2n$ transmission paths to be operative in accordance with said magnitude; means for inhibiting the operation of predetermined ones of said transmission paths connecting nodes of differing significances when a shift operation is to be performed in a first direction; and means for selectively inhibiting the operation of predetermined ones of said transmission paths connecting nodes of the same significance when a shift operation is to be performed in the other direction and the magnitude of the shift operation is one of a group of predetermined numbers.

6. A shift and rotate circuit in accordance with claim 5, wherein said plurality of transmission path groups includes a maximum of $(n-2)$ groups.

7. A shift and rotate circuit comprising a maximum of $(n-1)$ groups of $n$ nodes each, the nodes in each group having an ascending order of significance, the groups of nodes having an ascending order of significance; means for applying bit signals of a data word at the nodes in the most significant of said groups; a maximum of $(n-2)$ groups of $n$ first transmission path means each; the $n$ first transmission path means in each of said groups being connected between nodes of the same significance in two respective groups of said nodes for transmitting bit signals therebetween; a maximum of $(n-2)$ groups of $n$ second transmission path means each, the $n$ second transmission path means in each of said groups being connected between nodes having the same difference of significances in two respective groups of said nodes for transmitting bit signals therebetween; means dependent upon the magnitude of the shift or rotate operation to be performed in the shift and rotate circuit for inhibiting the operation of one of each of the two groups of $n$ transmission path means connected between the same two groups of nodes; means operative when the bit signals of the data word applied to said nodes in said most significant group are to be shifted in a first direction for inhibiting the operation of each of said second transmission path means connected between a node in one of said groups of nodes and a node of higher significance in a group of nodes of lower significance; and means operative when the bit signals of the data word applied to said nodes in said most significant group are to be shifted in the second direction for inhibiting the operation of predetermined ones of said first transmission path means dependent upon said magnitude.

8. A shift and rotate circuit in accordance with claim 7 further including means for controlling the magnitude of the shift performed in the shift and rotate circuit to be the complement of the actual shift magnitude required with respect to the number $n$ when said bit signals are to be effectively shifted or rotated in said second direction.

9. A shift and rotate circuit comprising a plurality of nodes arranged in a matrix array of rows and columns; a plurality of groups of first transmission path means, each group connecting the nodes in a respective row to respective nodes in the same columns in a respective adjacent row; a plurality of groups of second transmission path means, each group connecting the nodes in a respective row to respective nodes in different columns in the respective adjacent row, all of the second transmission path means in each of said groups being connected between nodes separated by the same number of columns; means for applying bit signals of a data word to the nodes in the first row of said matrix; means for representing the type of shift and rotate operation to be performed on said bit signals, a shift magnitude and a direction; means responsive to a first direction being represented for deriving a steering word which is the same as the represented shift magnitude and responsive to a second direction being represented for deriving a steering word which is the complement of said represented shift magnitude with respect to the number of columns in said matrix; means responsive to said steering word for controlling only one of the group of first transmission path means and the group of second transmission path means connected between nodes in the same two rows to transmit bit signals therethrough; first means responsive to a shift type of operation and said first direction being represented for inhibiting the operation of all of the second transmission path means connecting nodes in columns at one end of said matrix to nodes in columns at the other end of said matrix; second means responsive to a shift type of operation and said second direction being represented for inhibiting the operation of selected ones of said first transmission path means dependent upon said steering word; and means connected to the nodes in the last row of said matrix for transmitting said bit signals transmitted through said groups of first and second transmission path means from the nodes in said first row to the nodes in said last row.

10. A shift and rotate circuit in accordance with claim 9 wherein said first and second inhibiting means control the appearance of a bit signal of predetermined value at each node to which an inhibited transmission path means is connected.

11. A shift and rotate circuit in accordance with claim 9 wherein said first and second inhibiting means include means for controlling the inhibiting of the operation of first and second transmission path means connected between nodes in alternate pairs of adjacent rows by controlling the inhibiting of the operation of selected ones of the first and second transmission path means connected between nodes in the other alternate adjacent rows.

12. An arrangement for selectively shifting the bits of an $n$ bit position original data word in a first direction by any specified number $m$ of bit positions between 0 and $n$ comprising

- a plurality of serially connected and simultaneously operable rotate circuits, there being a maximum of $(n-2)$ rotate circuits in said plurality;
- $n$ input terminals for transmitting said original data word to the first rotate circuit in said plurality;
- $n$ output terminals for receiving a final $n$ bit resulting data word from the last rotate circuit in said plurality;
- each of said rotate circuits operative in a first mode for transmitting without change the bits of an $n$ bit data word received thereby to the next rotate circuit in said plurality and operative in a second mode for rotating the bits of an $n$ bit data word received thereby by a predetermined number of bit positions in a second direction and transmitting the resulting data word to the next rotate circuit in said plurality, said predetermined number being different for each of said rotate circuits;
- and control means comprising
  - operating means controlled in accordance with said any specified number $m$ for simultaneously operating all of said rotate circuits in a selected one of said first and second modes,
  - and means controlled in accordance with said any specified number $m$ for inhibiting selectively operation in said first mode by selected ones of said rotate circuits on selected bits of an $n$ bit data word received thereby.

13. An arrangement in accordance with claim 12, wherein said control means comprises

- means for deriving from said any specified number $m$ complementary number $(n-m)$ and for controlling said operating means selectively to operate said rotate circuits such that the sum of said predetermined numbers for those rotate circuits operated in said second mode is equal to said complementary number $(n-m)$ of bit positions.

14. An arrangement in accordance with claim 13, wherein said control means comprises

- selecting means for selecting each one of said selected bits upon which operation by a selected rotate circuit in said first mode is inhibited in accordance with said complementary number $(n-m)$, with the bit position of said selected one bit prior to operation thereon by said selected rotate circuit, and with the sum of said predetermined numbers for the rotate circuits which succeed said selected rotate circuit in said serially connected plurality.

15. An arrangement in accordance with claim 13, wherein said control means comprises

- means for determining for certain ones of said $n$ bits of each data word transmitted to each one of said rotate circuits if said certain bits are significant, a significant bit being one which will be rotated by operation of a subsequent rotate circuit in said plurality from the last of said $n$ bit positions to the first of said $n$ bit positions;
- and said selected bits comprise those bits determined to be other than significant.

16. An arrangement for selectively shifting and rotating the $n$ bits of an $n$ bit position original data word in a specified one of two directions by any specified number $m$ of bit positions between 0 and $n$ comprising

- a plurality of serially connected and simultaneously operable rotate circuits, there being a maximum of $(n-2)$ rotate circuits in said plurality;
- $n$ input terminals for transmitting said original $n$ bit data word to the first rotate circuit in said plurality;
- $n$ output terminals for receiving a final resulting $n$ bit data word from the last rotate circuit in said plurality;
- each of said rotate circuits operative in a first mode for transmitting without change the bits of an $n$ bit data word received thereby to the next succeeding rotate circuit in said plurality and operative in a second mode for rotating the bits of an $n$ bit data word received thereby by a predetermined number of bit positions in a first of said two directions and for transmitting the resulting data word to the next succeeding rotate circuit in said plurality, said predetermined number being different for each of said rotate circuits;
- and a control circuit for simultaneously controlling each of said rotate circuits in a selected one of said modes in accordance with received command signals specifying shift and rotate operations, said numbers $m$ and their directions to transmit said $n$ bits of said original data word from said input terminals through all said rotate circuits to said output terminals;
- said control circuit comprising
  - complementing means responsive to received command signals which specify shift and rotate operations opposite in direction to said first direction for generating modified command signals defining the complement $(n-m)$ of said number $m$ specified by said received command signals,
  - and energizing means responsive to received command signals specifying shift operations opposite in direction to said first direction and controlled in accordance with said modified command signals for generating rotate circuit control signals which simultaneously energize said rotate circuits in a selected one of said modes and which cause certain of said rotate circuits to transmit certain bits of the data word received thereby as binary 0's regardless of the value of said certain bits, said certain rotate circuits and said certain bits being selected in accordance with said modified command signals.

17. An arrangement in accordance with claim 16 wherein said control circuit comprises selecting means for controlling said energizing means and comprising means controlled in accordance with said modified command signals for determining for preselected ones of said *n* bits of each *n* bit position data word transmitted to each rotate circuit if said preselected bits are insignificant, and insignificant bit being a bit which will be rotated by operation of all subsequent rotate circuits of said plurality from the bit position in which it is received from the preceding rotate circuit only to a bit position between said bit position in which said bit is received and the end of said transmitted *n* bit position data word;

and said selected certain bits comprise those of said preselected bits determined to be insignificant.

18. A logic arrangement comprising

*n* (e.g., 20) input terminals (e.g., terminals 19–0) arranged in a numerically ordered sequence (e.g., 19, 18, 17 . . . 2, 1 and 0) for receiving the correspondingly ordered *n* bits of a data word;

*n* output terminals (e.g., 19F–0F) arranged in the same numerical sequence as said *n* input terminals (19–0);

less than *n* logic stages (e.g., A, B, C, D, E) connected between said input and output terminals, each logic stage (e.g., A) including gating elements (e.g., A19–A0) arranged in the same numerical sequence as the input terminals (19–0), each gating element (e.g., A19) selectively operative with respect to one of the correspondingly ordered *n* bits (e.g., the most significant bit) of a received data word, and said gating elements (e.g., A19–A0) of each logic stage (e.g., A) selectively operative in a first manner (e.g., operating A19D–A0D) to transmit and rotate said *n* bits of said received data word in the same one direction (e.g., right) by the same predetermined number *p* (e.g., 1) of bit positions, said predetermined number *p* of bit positions being different (e.g., 1, 2, 4, 8, 16) for each respective logic stage (A, B, C, D, E);

a control arrangement (e.g., FIG. 9 and FIG. 10) responsive to control information (HR or QR, X1–X16) specifying either a shift or rotate operation in said one direction (e.g., right) and the magnitude *m* (e.g., 13) thereof for selectively operating said logic stages (A–E) in said first manner in an additive combination (e.g., A+C+D) such that the total of said predetermined numbers *p* of bit positions (e.g., 1+4+8) for said logic stages (e.g., A, C and D) operated in said first manner is equal to said specified magnitude *m* (e.g., 13), and responsive to control information (e.g., HR) specifying a shift operation in said one direction (e.g., right) for causing predetermined gating elements (e.g., A0, C3–C0, D7–D0) from a first predetermined group of said gating elements (e.g., A0, B1–B0, C3–C0, D7–D0 and E15–E0) in said logic stages (e.g., A, C, D) operated in said first manner to transmit binary 0's;

said logic arrangement CHARACTERIZED IN THAT said gating elements (e.g., A19–A0) of each of said logic stages (e.g., A) are selectively operative in a second manner (e.g., operating A19–A0V) to transmit said *n* bits of said received data word without change of bit position;

said control arrangement (FIG. 9 and FIG. 10) is responsive to other other control information (e.g., HL, X1–X16) specifying a shift operation in the opposite direction (e.g., left) and the magniture *m* (e.g., 13) thereof for selectively operating said logic stages (A–E) in another additive combination (e.g., A+B+C+D+E) such that the total of said predetermined numbers *p* (e.g., 1+2+4) of bit positions for said logic stages (e.g., A, B, C) selectively operated in said first manner is equal to the complement ($n-m$) (e.g., $20-13=7$) of said specified magnitude m (e.g., 13) with respect to *n* (e.g., 20) and for causing other selected gating elements (e.g., D12–D5; E4–E0) from a second predetermined group of said gating elements (e.g., A19, B18–B17, C16–C13, D12–D5 and E4–E0) in certain (e.g., D, E) of said selectively operated logic stages (A–E) to transmit binary 0's, said other selected gating elements (e.g., D12–D5; E4–E0) and said certain operated logic stages (e.g., D, E) being selected in accordance with said complement ($n-m$) (e.g., $20-13$) of said shift magnitude *m* (e.g., 13) specified by said other control information (e.g., HL, X1–X16).

19. A logic arrangement in accordance with claim 18 characterized in that:

said control arrangement (FIG. 9 and FIG. 10) is responsive to said other control information (e.g., HL, X1–X16) for simultaneously operating all the logic stages (A, B, C, D, E) in either said first or second manner so as to establish a selected multi-element path (e.g., 12A, A12D, 11B, B11D, 9C, C9D, 5D, D5V, 5E, E5V) from each input terminal (e.g., terminal 12) to a different one of said output terminals (e.g., 5F), each path including only a single gating element (e.g., C9) of each logic stage (e.g., C);

and said other selected gating elements (e.g., D12–D5; E4–E0) caused by said control arrangement to transmit binary 0's comprise a single gating element (e.g., D5) in each path established from an input terminal (e.g., terminal 12) to an output terminal (e.g., 5F) whose relative position (e.g., fifteenth) in said sequence (e.g., 19, 18 . . . 2, 1, 0) is numerically beyond the relative position (e.g., eighth) of said input terminal (e.g., terminal 12) in said sequence.

20. A logic arrangement in accordance with claim 19 characterized in that:

all said logic stages (A–E) are connected in series between said input terminals (19–0) and said output terminals (19F–0F) and are arranged in an ascending order corresponding to the relative values of *p* (e.g., 1, 2, 4, 8, 16) for said respective stages, said logic stage (e.g., A) for which *p* has the smallest value (e.g., 1) being connected to said input terminals (19–0) and the logic stage (e.g., E) for which *p* has the largest value (e.g., 16) being connected to said output terminals (19F–0F).

21. A logic arrangement in accordance with claim 20 characterized in that:

said second predetermined group of gating elements (e.g., A19, B18–B17, C16–C13, D12–D5 and E4–E0) includes only those gating elements (e.g., C16–C13) which are succeeded by no more than ($n-p$) (e.g., $20-4=16$) gating elements in said numerical sequence (e.g., 20, 19 . . . 1, 0) of gating elements (e.g., C19–C0) of the logic stage (e.g., C) including said gating elements (e.g., C16–C13).

22. A logic arrangement in accordance with claim 21 characterized in that:

said second predetermined group of gating elements (e.g., A19, B18, B17, C16–C13, D12–D5, E4–E0) includes no more than *n* gating elements and each gating element (e.g., D5) in said second predetermined group is located in the logic stage (e.g., D)

nearest said output terminals (19F–0F) in which said criteria of claim 21 can be met.

23. A logic arrangement in accordance with claim 21 characterized in that:

said other selected gating elements (e.g., D12–D5, E4–E0) caused by said control arrangement (FIG. 9 and FIG. 10) to transmit binary 0's comprise elements of only those logic stages (e.g., D and E) operated in said second manner.

References Cited

UNITED STATES PATENTS

| | | | |
|---|---|---|---|
| 3,076,181 | 1/1963 | Newhouse | 340—174 |
| 3,166,668 | 1/1965 | Marsh | 235—157 |
| 3,192,363 | 6/1965 | MacSorley | 235—164 |
| 3,193,808 | 7/1965 | Sanders | 340—174 |
| 3,210,737 | 10/1965 | Perry et al. | 340—172.5 |
| 3,229,080 | 1/1966 | Ward | 340—172.5 |
| 3,238,377 | 3/1966 | Seeber | 235—176 |
| 3,258,584 | 6/1966 | Buchholz et al. | 235—164 |
| 3,274,556 | 9/1966 | Paul et al. | 340—172.5 |

OTHER REFERENCES

G. T. Paul et al. Column Shifter. In IBM Technical Disclosure Bulletin. 4(10): pp. 79–80. March 1962.

H. W. Cochrane. Cathode Ray Tube Shift Unit. IBM Technical Disclosure Bulletin. 2(4): pp. 44–45. December 1959.

H. W. Cochrane. Core Matrix Shift and Complement. In IBM Technical Disclosure Bulletin. 2(4): pp. 120–122. December 1959.

ROBERT C. BAILEY, *Primary Examiner.*

PAUL J. HENON, *Examiner.*

J. P. VANDENBURG, *Assistant Examiner.*